US 6,957,248 B2

(12) United States Patent
Quine et al.

(10) Patent No.: US 6,957,248 B2
(45) Date of Patent: Oct. 18, 2005

(54) SYSTEM AND METHOD FOR FORWARDING ELECTRONIC MESSAGES

(75) Inventors: Douglas B. Quine, Bethel, CT (US); Alexander B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 851 days.

(21) Appl. No.: 09/920,059

(22) Filed: Aug. 1, 2001

(65) Prior Publication Data

US 2002/0023138 A1 Feb. 21, 2002

Related U.S. Application Data

(63) Continuation-in-part of application No. 09/629,909, filed on Jul. 31, 2000, and a continuation-in-part of application No. 09/629,911, filed on Jul. 31, 2000, now Pat. No. 6,832,246, and a continuation-in-part of application No. 09/629,904, filed on Jul. 31, 2000, and a continuation-in-part of application No. 09/648,576, filed on Aug. 28, 2000, now abandoned, and a continuation-in-part of application No. 09/751,490, filed on Dec. 28, 2000, now Pat. No. 6,839,738, and a continuation-in-part of application No. 09/750,952, filed on Dec. 28, 2000.

(51) Int. Cl.[7] .............................................. G06F 15/16
(52) U.S. Cl. ..................................... 709/206; 709/238
(58) Field of Search ................................. 709/206, 238

(56) References Cited

U.S. PATENT DOCUMENTS

| 5,138,653 A | 8/1992 | LeClercq .................... 379/96 |
| 5,281,962 A | 1/1994 | Vanden ...................... 340/825 |
| 5,283,856 A | 2/1994 | Gross .......................... 395/51 |
| 5,333,152 A | 7/1994 | Wilber ........................ 379/98 |
| 5,333,266 A | 7/1994 | Boaz et al. .................. 395/200 |
| 5,377,354 A | 12/1994 | Scannell et al. ............ 395/650 |
| 5,381,527 A | 1/1995 | Inniss et al. ................ 395/200 |
| 5,406,557 A | 4/1995 | Baudoin ...................... 370/61 |

(Continued)

OTHER PUBLICATIONS

Two (2) webpages from www.switchemail.com website printed on Nov. 1, 2002.
E Veripost, "Search Results", 5 pages, Aug. 15, 2001.
E Veripost, "Changed Your E–mail Address", 3 pages Aug. 20, 2001.
E. Veripost, "Keep in Touch After Gruadation with Veripost", 2 pages, Apr. 30, 2001.
E Veripost, "Have you Changed your E–mail Address", 12 pages, Mar. 30, 2001.
Computermail.net, www.email addresses.com, "Free Email Address Directory", May 10, 2001.
Computermail.net, www.emailaddress.com, "Finding Email Address", May 10, 2001.
Computermail.net, www.emailaddress.com, "Large Email Directories", May 10, 2001.
IMarketing News, iMarketingNews.com/news/article, Jupiter Retailing Forum, ActiveNames Is Latest Victim of Economic Slowdown, May 21–22, Chicago.
ActiveNames™, www.activenames.com, "About Us", Jan. 10, 2001, 24 pages.
Re–route.com, www.re–route.com, Re–route E–mail Forwarding Service, Mar. 12, 2001, 19 pages.

(Continued)

Primary Examiner—Wen-Tai Lin
(74) Attorney, Agent, or Firm—George M. Macdonald; Michael J. Cummings; Angelo N. Chaclas

(57) ABSTRACT

A method and system for forwarding an e-mail message addressed to a first disfavored e-mail address to a second preferred forwarding e-mail address. A message is received at an e-mail forwarding computer, the message identifying the first disfavored e-mail address. The e-mail forwarding computer parses the first e-mail address from the message to determine if there is a second preferred forwarding e-mail address associated with the first e-mail address. If there is a second e-mail address associated with the first e-mail address, the e-mail forwarding computer sends the e-mail message to a third computer associated with the second e-mail address.

68 Claims, 14 Drawing Sheets

U.S. PATENT DOCUMENTS

| | | | |
|---|---|---|---|
| 5,428,663 A | 6/1995 | Grimes et al. | 379/57 |
| 5,436,960 A | 7/1995 | Campana, Jr. | 379/58 |
| 5,455,572 A | 10/1995 | Cannon et | 340/825 |
| 5,479,408 A | 12/1995 | Will | 370/94.1 |
| 5,479,411 A | 12/1995 | Klein | 379/88 |
| 5,483,466 A | 1/1996 | Kawahara et al. | 364/514 |
| 5,487,100 A | 1/1996 | Kane | 379/57 |
| 5,495,234 A | 2/1996 | Capp | 340/825 |
| 5,513,126 A | 4/1996 | Harkins et al. | 364/514 |
| 5,555,346 A | 9/1996 | Gross et al. | 395/51 |
| 5,608,786 A | 3/1997 | Gordon | 379/100 |
| 5,627,764 A | 5/1997 | Schutzman et al. | 364/514 |
| 5,635,918 A | 6/1997 | Tett | 340/825 |
| 5,647,002 A | 7/1997 | Brunson | 380/49 |
| 5,822,526 A | 10/1998 | Waskiewicz | 395/200 |
| 5,844,969 A | 12/1998 | Goldman et al. | 379/93.24 |
| 5,884,272 A | 3/1999 | Walker et al. | 705/1 |
| 5,937,161 A | 8/1999 | Mulligan et al. | 395/200.36 |
| 5,938,725 A | 8/1999 | Hara | 709/206 |
| 5,944,787 A | 8/1999 | Zoken | 709/206 |
| 5,961,590 A | 10/1999 | Mendez et al. | 709/206 |
| 5,968,117 A | 10/1999 | Schuetze | 709/206 |
| 5,978,837 A | 11/1999 | Foladare et al. | 709/207 |
| 5,987,508 A | 11/1999 | Agraharam et al. | 358/402 |
| 6,035,327 A | 3/2000 | Buckley et al. | 709/206 |
| 6,049,291 A | 4/2000 | Kikinis | 340/825.44 |
| 6,088,720 A | 7/2000 | Berkowitz et al. | 709/206 |
| 6,092,114 A | 7/2000 | Shaffer et al. | 709/232 |
| 6,138,146 A | 10/2000 | Moon et al. | 709/206 |
| 6,157,945 A | 12/2000 | Balma et al. | 709/206 |
| 6,427,164 B1 * | 7/2002 | Reilly | 709/206 |
| 6,438,583 B1 * | 8/2002 | McDowell et al. | 709/206 |
| 2001/0049745 A1 * | 12/2001 | Schoeffler | 709/238 |
| 2002/0042815 A1 * | 4/2002 | Salzfass et al. | 709/206 |

OTHER PUBLICATIONS

Wall Street Journal, Market Place, E–World, "Many Internet Users Find Themselves Stuck at Their Old Address", by Julia Angwin, Aug. 28, 2000.

Internet Solutions, "Email for Life", "Here's how to keep the same e–mail address through all of life's changes", Sheryl Canter, PC Magazine, Mar. 21, 2000.

The Washington Post, Business, "The Download, The address you leave behind", Shannon Henry, Mar. 15, 2001.

Return Path, "Seven Techniques to Improve Email List Integrity",Tim Dolan, May 18, 2001.

Opti–innews™, "Return Path Grows To 90 Million Signing Brooks Brothers, Radisson & Publishers Clearinghouse", May 17, 2001.

ReturnPath, "About Us", Nov. 27, 2001, 11 pages.

ReturnPath, ECOA and PureList™, May 17, 2001, 15 pages.

ReturnPath, SmartBounce™, What is SmartBounce?, Jan. 10, 2001, 7 pages.

* cited by examiner

500

TO: DQuine@luv-npi.com

RE: Hello

I have not communicated with you in a long time - how is everything?

Delivery Failure Report

Your document: Hello
was not delivered to: dquine@luv-npi.com
because: The specified address contains a host or domain name that could not be found by the Domain Name Server or local hosts file.

TO: DQuine@luv-npi.com

RE: Hello

I have not communicated with you in a long time - how is everything?

FIG. 5B

| Disfavored E-Mail Address | Forwarding E-mail Address |
|---|---|
| Doug@yahoo.com<br>Doug@hotmail.com<br>Doug@obsolete.com | Doug@current.com |
| Doug@obsolete.com | Doug@work.com<br>Doug@home.com<br>Doug@wireless.com |
| Doug@yahoo.com<br>Doug@hotmail.com<br>Doug@obsolete.com | Doug@work.com<br>Doug@home.com<br>Doug@wireless.com |

FIG. 6

SYSTEM AND METHOD FOR FORWARDING ELECTRONIC MESSAGES

This application is a continuation-in-part of the following applications: Ser. No. 09/629,909, titled SYSTEM AND METHOD FOR FORWARDING ELECTRONIC MESSAGES, filed Jul. 31, 2000; Ser. No. 09/629,911, titled DYNAMIC ELECTRONIC FORWARDING SYSTEM, filed Jul. 31, 2000 now U.S. Pat. No. 6,832,246; Ser. No. 09/629,904, titled E-MAIL FORWARDING SYSTEM HAVING ARCHIVAL DATABASE, filed Jul. 31, 2000; Ser. No. 09/648,576, titled REMOTE E-MAIL FORWARDING SYSTEM, filed Aug. 28, 2000 abandoned; Ser. No. 09/751,490, titled SYSTEM AND METHOD FOR CLEANSING ADDRESSES FOR ELECTRONIC MESSAGES, filed Dec. 28, 2000 now U.S. Pat No. 6,839,738; Ser. No. 09/750,952, titled SYSTEM AND METHOD FOR CLEANSING ADDRESSES FOR ELECTRONIC MESSAGES, filed Dec. 28, 2000. The disclosures for each of the applications listed above are hereby expressly incorporated by reference.

FIELD OF THE INVENTION

The present invention relates to a system and method for forwarding electronic messages, and more particularly, relates to forwarding e-mail messages intended to be initially delivered to an obsolete or disfavored address to a chosen forwarding address associated with the obsolete or disfavored e-mail address.

BACKGROUND OF THE INVENTION

Recent advances in telecommunications networks have drastically altered the manner in which people interact and conduct business. These advances promote efficiency and convenience in one's ability to receive important information. With this in mind, individuals and businesses today find that their physical and electronic addresses are changing faster than ever with increased mobility and competing message delivery services. Deregulation and privatization of the global postal systems, competing package delivery services, and rapid growth of multiple competing electronic mail (e-mail) systems are creating an environment in which there is no single point of contact for address correction as there was when the sole messaging provider was the national postal service.

Users who enjoy the benefit of sending and receiving e-mail messages typically subscribe to an Internet Service Provider (ISP) offering such e-mail capabilities (e.g., America Online (AOL), Netcom, and Redconnect) and/or may subscribe to an internet based e-mail service (e.g., juno, rocketmail, yahoo) which each is associated with a particular e-mail address. Thus, the e-mail address is unique to the e-mail service provider. The uniqueness of an address to a selected provider is often apparent on the face of the address, e.g., DQuine@aol.com, Quine@juno.com or DouglasQuine@yahoo.com. A user or subscriber to a particular e-mail service may from time to time desire or need to change service providers (e.g., from DQuine@aol.com to QuineDo@pb.com). Exemplary motivation for these changes may derive from the fact that an alternative service provider charges lower rates, or the existing provider's inability to upgrade its service.

A user who desires to change from one e-mail service provider to another suddenly faces the reality of being bound to the old service provider because the user's address is unique to that one provider. A sudden and complete changeover is in many circumstances impossible because the community of people who wish to send electronic messages to the user are only aware that the old address exists. For example, an e-mail address may be published in an industry directory that is only published once every year or two years. Alternatively, the e-mail address may be printed on a business card which cannot be retracted and corrected. Thus, the user incurs a potentially significant loss of prospective business by abandoning the old address.

Currently, there is no effective means in place for address correction of e-mail addresses. Even if the e-mail sender is highly diligent, there are no resources or processes available to identify corrected electronic address information. The problem is further accentuated by the fact that extreme competition in internet service providers, and likewise e-mail service providers, results in extremely high obsolesce of e-mail addresses with no means for e-mail forwarding (e.g., closing an AOL e-mail account provides no option for forwarding e-mail intended for that account to a new e-mail address).

Further, today's web savvy users may have multiple e-mail addresses which periodically change as new features develop or are lost. Entire domain names can be lost (e.g., lostdomain.com) and all mail directed there may be lost as well. In either case, typically the MAIL DAEMON message is returned to the sender, notifying the sender that the e-mail address cannot be found and e-mail message is being returned to the sender.

Some service providers offer their user-subscribers the option of a message forwarding service. These forwarding services operate by receiving the incoming message, retrieving the portion of the incoming message that identifies a selected user who subscribes to the forwarding service, associating the selected user with a forwarding address through the use of a lookup table, and transmitting the message to the forwarding address. The forwarding services differ from the normal message delivery service that the central service provider offers because a portion of the forwarding address belongs to another central service provider. Thus, the forwarded message is actually delivered to its intended recipient by the other or second service provider, i.e., the forwarded message passes through two central service providers, as opposed to just one provider. The intended message recipient is free to change the second provider with regularity provided that the recipient always informs the forwarding service of each change in the second provider. However, this message forwarding system only works with viable e-mail address, that is, the e-mail address associated with the first service provider must still be active and not obsolete. In fact, few e-mail services offer forwarding services and few, if any, offer to forward e-mail after the account is closed. Otherwise, the first service provider is only enabled to send the later mentioned MAIL DAEMON message back to the original sender of the e-mail message.

Obsolescence of e-mail addresses can be a particular problem in a modern business environment. Many companies provide e-mail addresses by which employees send and receive messages in conducting business. When employees leave a company, the employer is faced with the problem of what to do with messages sent to the former employee's work e-mail address. On one hand, e-mail messages received at company e-mail accounts are generally considered to be company property, and the company has an interest in receiving messages relating to its business. On another hand, the reality is that many employees also receive personal and junk mail messages on their company e-mail accounts. Rather than risk impinging on the former employees' privacy, and to avoid the expense of manually sorting out important business related messages, companies will often choose to simply close the former employees' e-mail account and lose the potential business related messages.

When a new employee joins a company, there is often a period of administrative delay before an appropriate company e-mail account is opened for the new employee. During the delay others may attempt to send e-mail messages to the new employee before the new account is opened. Under existing systems and methods, those premature e-mail message will most likely be lost, and not received by the new employee.

E-mail addresses also become obsolete as a result of changes to business e-mail domain names. An e-mail domain name change may occur for a variety of reasons including mergers and acquisitions of companies, rebranding, or corporate or divisional name changes. In addition to changing domain names, companies may also revise the address name formats, adding further difficulty to proper delivery of e-mail messages.

SUMMARY OF THE INVENTION

Accordingly, the present invention relates to a method and system for forwarding an e-mail message intended to be delivered to a disfavored e-mail address to an associated forwarding e-mail address. An e-mail forwarding computer, with a third e-mail address, is programmable to associate disfavored e-mail addresses with forwarding e-mail addresses. In a first embodiment, undeliverable e-mail is returned to the sender and is then redirected to the e-mail forwarding computer, with a third e-mail address (or Internet address), for correction. In another embodiment, the mail servers or ISP routers serving the undeliverable mail may direct the undeliverable mail automatically to the e-mail forwarding computer, with a third e-mail address (or Internet address) for correction.

In the first embodiment, a user sends an e-mail message to a first e-mail address. If the first e-mail address is obsolete, or otherwise undeliverable, the message is often returned to the user with an indication that it is undeliverable. When this e-mail message is returned to the user, the user resends the undeliverable e-mail, originally addressed to the first e-mail address, to a third e-mail address for a remote e-mail forwarding computer that is capable of forwarding the e-mail message to a second e-mail address. The forwarding computer receives the e-mail message and parses the first e-mail address from the e-mail message to determine if there is a second e-mail address associated with the first e-mail address. If there is a second e-mail address associated with the first e-mail address, the forwarding computer sends the e-mail message to the second associated e-mail address.

If there is not a second e-mail address associated with the first e-mail address then the domain name of the first e-mail address may be parsed therefrom to determine if the domain address of the e-mail address has been registered with the forwarding computer. If yes, then a cleansed or suggested new format for the once undeliverable e-mail message may be sent to the user.

The e-mail forwarding computer may be further operative to initiate additional actions for e-mail messages received from predetermined senders. For example, a subscriber for the e-mail forwarding services of the forwarding computer may store names of predetermined senders (e.g., chrisc@mail.com) and if it receives an e-mail message from that predetermined sender (chrisc@mail.com) desiring to forward a message to the subscriber, then the forwarding computer may be configured to prevent such an e-mail forwarding action, as well as notify the sender of the denial of forwarding services in regards to at least that subscriber.

If the e-mail forwarding computer is unable to find a match for the disfavored e-mail address, it preferably stores in an archival database at least the disfavored e-mail address (and ideally also the sender's address, date, and message text). The forwarding computer then subsequently checks after new subscribers register for the services of the forwarding computer, and determines whether a forwarding e-mail address has been associated with the unmatched e-mail address. If there is such a match, the remote computer than sends at least a message to the forwarding address that a sender at a sender's e-mail address has attempted to send a message. Alternatively, the forwarding computer can send a message to the sender indicating that a forwarding address has not been associated with the previously unmatched undeliverable address.

As an alternative embodiment, rather than having the message sender forward the undeliverable e-mail to the forwarding computer. A domain owner for the domain identified in the undeliverable e-mail address may configure its e-mail server to automatically forward undeliverable mail items to the forwarding computer. For example, an ISP, such as AOL (owning aol.com), can assist in more efficiently delivering messages to the appropriate e-mail address by redirecting undeliverable messages to the third party registry of e-mail addresses and corresponding forwarding addresses included in the forwarding computer. Thus, the forwarding computer could serve as a neutral point of contact between competing ISPs, and the competing ISPs need not share any information with each other about their customers.

Similarly, in the business environment, a company, such as Pitney Bowes, that owns the domain identified in the domain portion of an e-mail address, such as pb.com, may also choose to direct all undeliverable e-mail to the forwarding computer. The forwarding computer can then determine whether there is an associated forwarding address. Such determination may include performing address hygiene on the undeliverable address to determine whether an inappropriate format was used to compose the undeliverable address (e.g. quinedo@pb.com should be douglas.quine@pb.com).

Also in the context of a business owned domain, the forwarding computer may be programmed to associate the disfavored e-mail address of a former employee, or a reassigned employee, with that of a successor employee. Thus, for example, if an employee's company e-mail account had been closed because the employee left the company, then e-mail to the former employee's e-mail account may be redirected by the forwarding computer to an associated successor employee. In addition, prior to redirecting the message to the successor employee, the forwarding computer may notify the original sender that the original intended recipient is not available, and offer the option of whether or not to redirect the message to the successor (protecting privacy and reducing corporate legal exposure associated with forwarding mail from one individual's address to another's).

In an additional embodiment applicable to an e-mail domain address owner, a company owning an e-mail domain address may choose to register all of its employee and departmental e-mail addresses in a bulk uploading procedure. Subsequently, changes to address formats and domain names can be tracked and defunct addresses associated with new ones by utilizing the services of the e-mail forwarding computer. Also, through address cleansing and hygiene, undeliverable addresses written in an incorrect format may be associated with correct addresses with accuracy.

Thus, an advantage of the present invention is that there is little or no cooperation needed from the e-mail server associated with the disfavored e-mail address. That is, if an e-mail address becomes disfavored (it is no longer an active e-mail address) either because the associated e-mail server ceases to exist, or the e-mail account has been left abandoned for a host of reasons, the present invention e-mail forwarding system nevertheless operates. Also, the present invention can offer additional enhanced functionality by obtaining minimally invasive cooperation from the e-mail server associated with the disfavored e-mail address. An additional benefit is that when an e-mail message is forwarded by the present invention, the privacy of the recipient is protected because the e-mail sender of the e-mail message is preferably not notified of the recipient's forwarding address. The recipient may choose to whom he or she wishes to send the corrected e-mail address.

If the sender affirmatively wishes to know the address correction, the sender may include an address correction request in the forwarded message, asking the recipient to release that address correction when they receive the forwarded message. The recipient may be presented with the option to allow the sender to provide corrected address information to other potential senders. A sender may offer to pay the addressee, or an authorized third party, to provide information about the corrected address. Such a system of passing along information about corrected addresses may be useful in a situation where the addressee remembers to inform one on-line biller of the new e-mail address to replace a defunct one, but neglects to inform other billers. By authorizing billers to share the new e-mail address, the billers can more efficiently continue to send the on-line billing information to its customers, even when e-mail addresses have changed.

The invention can provide confirmations to the sender that messages have been relayed, are being held pending enrollment (with an option to cancel or hold), or require permission to forward because the recipient identify/ownership of the mail box has not been verified.

For security purposes, the invention can hold digital certificates to ensure that all addresses are authenticated and that all parties to the communication are known.

DETAILED DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which:

FIGS. 5A–5C depict e-mail messages illustrating the operability of the e-mail messaging system of FIG. 1.

FIG. 6 depicts a look-up table having dynamic parameters in accordance with the present invention;

DETAILED DESCRIPTION OF THE PREFERRED EMBODIMENTS

Preferred Environment

Figure 1:
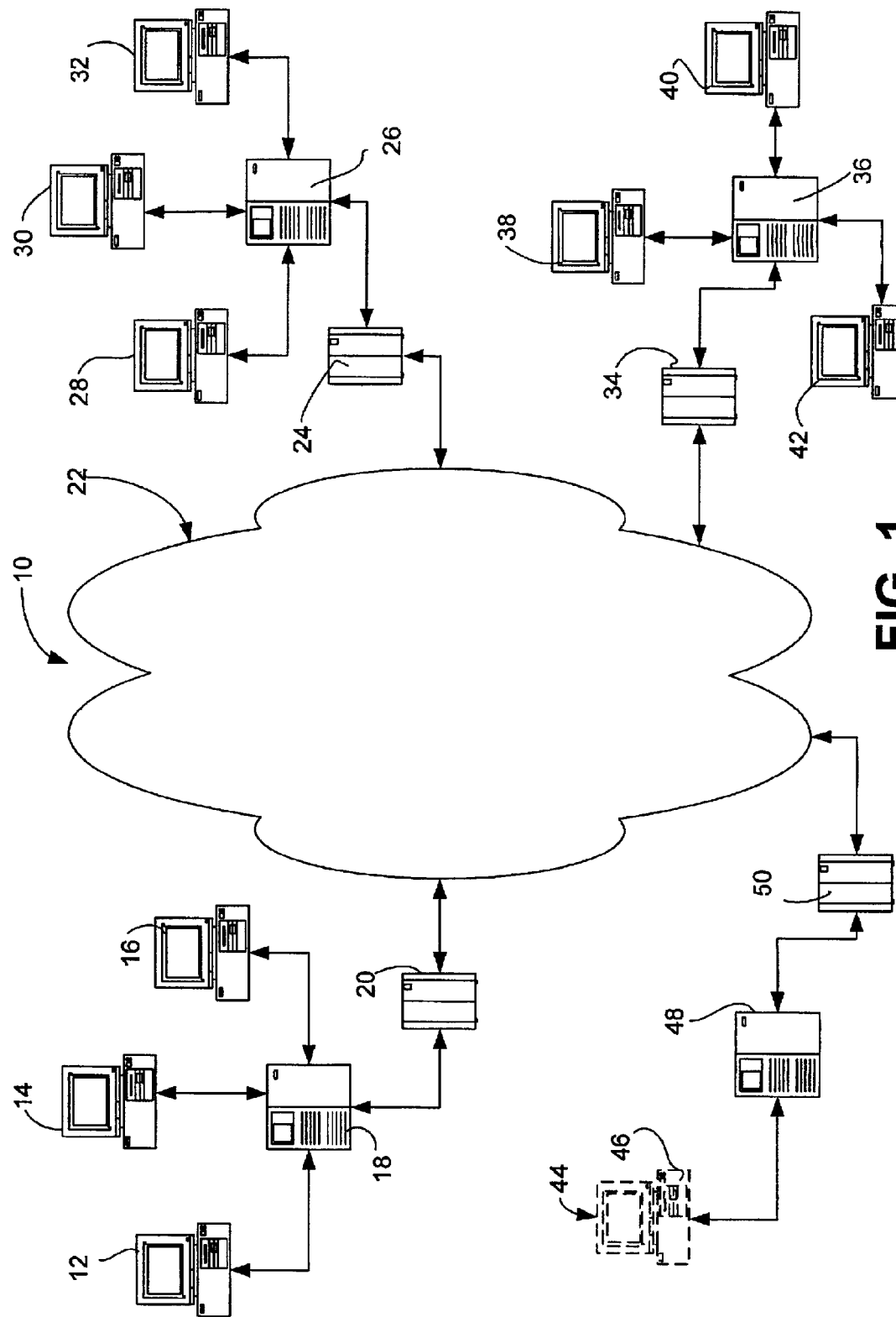
FIG. 1 depicts an electronic e-mail messaging system embodying the present invention.

FIG. 1 schematically depicts a conventional INTERNET telecommunications system 10. The FIG. 1 system is exemplary in nature. The present invention can be implemented as program control features on substantially all telecommunications service provider systems, and system 10 is intended to represent any operable telecommunications system that is used by any telecommunications service provider in conducting communication operations (e.g., facsimile, pager, mobile phone and PDA computers).

It is to be appreciated that the term "INTERNET" is well known in the art as designating a specific global international computer network that operates according to the TCP-IP protocol. A portion of the INTERNET receives or has in the past received funding from various United States governmental agencies including ARPA, NSF, NASA, and DOE. INTERNET communications protocols are promulgated by the Internet Engineering Task Force, according to standards that are currently set forth in RFC 1602.

Telecommunications system 10 includes a plurality of user or signal origination sites 12, 14 and 16, with each site being depicted in reference to a PC capable of generating and transmitting e-mail messages, wherein each site 12, 14 and 16 corresponds to a specific telecommunications address. A user may utilize one site or a plurality of sites. A single city or local service area may have millions of these signal origination sites. Each site 12, 14 and 16 corresponds to a telecommunication address that belongs to an individual, business, and other entity having need to avail themselves of telecommunications services.

It is to be understood that preferably each origination site 12, 14 and 16 feeds its signal (addressed to a subscriber identified at a selected service provider) to an internet service provider 18 (ISP), which in turn preferably feeds the signal to a local router node 20 that directs the local signal to a relay system, e.g., the INTERNET (conventionally depicted as a cloud) 22, which transmits the signal to a router 24 through a series of relays. The signal eventually arrives at an internet service provider 26 through router 24.

As can be seen in FIG. 1, a plurality of destination sites 28, 30, 32, 38, 40 and 42 are shown connected to internet service providers 26 and 36 with each site being depicted in reference to a PC capable of generating and transmitting e-mail messages, wherein each site corresponds to a specific telecommunications address. It is of course to be appreciated that telecommunications system 10 includes a plurality of routers (e.g., routers 24 and 34 with each internet service provider being connected to a plurality of user sites (e.g., PC's 38, 40 and 42). It should also be appreciated that internet service providers 18, 26, 36, and 48 may be a consumer subscription oriented ISPs, such as AOL, or an institutional e-mail communication service provided by a company to provide e-mail for employees.

In accordance with the present invention, telecommunications system 10 additional includes a messaging forwarding system 44, which as will be further discussed below, enables e-mail messages to be automatically forwarded to a forwarding address, which forwarding address is associated with a currently undeliverable e-mail address. Messaging forwarding system 44 preferably includes a PC 46 connected to an internet service provider 48, which PC 46 is provided with a unique e-mail address (corrections@emailangel.com) and software programmed to perform the below described steps necessary to operate the present invention e-mail forwarding system 44. PC 46 may have more than one unique e-mail address. The different addresses may connect to varying forwarding service that can be provided by forwarding system 44, and to receive different formats of submissions to forwarding system 44. Internet service provider 48 is preferably connected to INTERNET 22 via router 50. It will be understood by those skilled in the art that message forwarding system 44 may include any suitable computer processing device as an alternative to PC 46.

Figure 4:
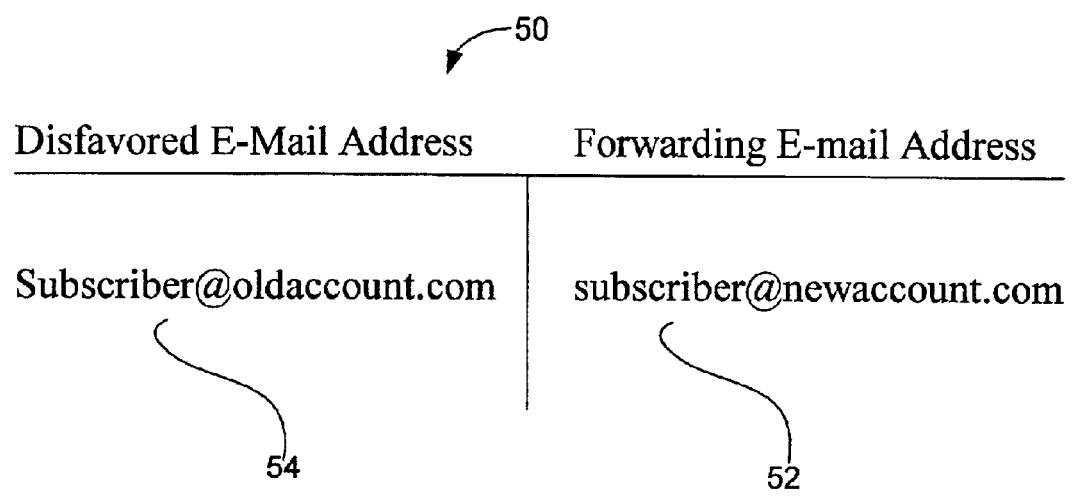
FIG. 4 depicts a look-up table used by the present invention.

As shown in FIG. 4, system 44 includes a software program that includes a look-up table 50, which is programmable to provide an e-mail forwarding address 52 associated with pre-programmed defunct (undeliverable) e-mail address[es] 54. It is to be appreciated that the look-up table 50 of system 44 may be accessed or programmed through any conventional known means, including via the internet 22 in which a user at PC site 28 accesses the look-up table 50 in system 44, via the internet 22, via routers 24 and 50, and internet service providers 26 and 48. Look-up table 50 may include a plurality of defunct subscriber addresses,(54+N), with each defunct address being associated with one or more forwarding addresses (52+M)

It is to be appreciated that in this description of the present invention system 44, mention is made to both a "user" and "subscriber" of system 44. It is to be understood that a "user" of system 44 refers to anyone who is capable of transmitting an e-mail message and accesses system 44 when it is desired to forward the message to a forwarding address, which forwarding address the user is unaware of. A user may also be referred to as a "sender" of an e-mail. A "subscriber" of system 44 refers to anyone who subscribes to the e-mail forwarding service of system 44 in which the subscriber registers both a defunct e-mail address 54 and at least one e-mail forwarding address 52 with system 44. A subscriber may also be referred to as a "recipient" of an e-mail using the present invention. E-mail forwarding system 44 is accessible by any user.

In illustration, if a subscriber of system 44 closes an e-mail account (e.g., user@oldaccount.com) for whatever reason, the subscriber may still desire to continue to receive messages sent to that address (e.g., user@oldaccount.com), but now wants to receive those messages at a different account (e.g., subscriber@newaccount.com). In the prior art, to accomplish this the subscriber had to resort to informing everyone who had the old e-mail address (e.g., user@oldaccount.com) of the new e-mail address (e.g., subscriber@newaccount.com). In accordance with the present invention, the subscriber accesses the subscriber's designated account in system 44, via any known means such as the internet, registers the defunct e-mail address (e.g., user@oldaccount.com) and associates it with a desired forwarding e-mail address (e.g., subscriber@newaccount.com). Thus when a sender of an e-mail desires to transmit a message to a subscriber of system 44 but only knows the subscriber's old e-mail address (e.g., user@oldaccount.com), which account is no longer active, the user now merely looks to system 44 to forward the message to an active account (e.g., subscriber@newaccount.com), as will be discussed further below.

As indicated above, FIG. 1 is exemplary in nature, and those skilled in the art understand that equivalent substitutions of system components can be made. For example, electrical communications over conductive telephone lines, optical communications over optical fibers, radio communications, and microwave communications are substantially equivalent for purposes of the invention. Likewise, messages could be relayed through e-mail, facsimile, pager, PDA device or other capable communications system.

Determining that an E-Mail Message is Undeliverable

Figure 2:
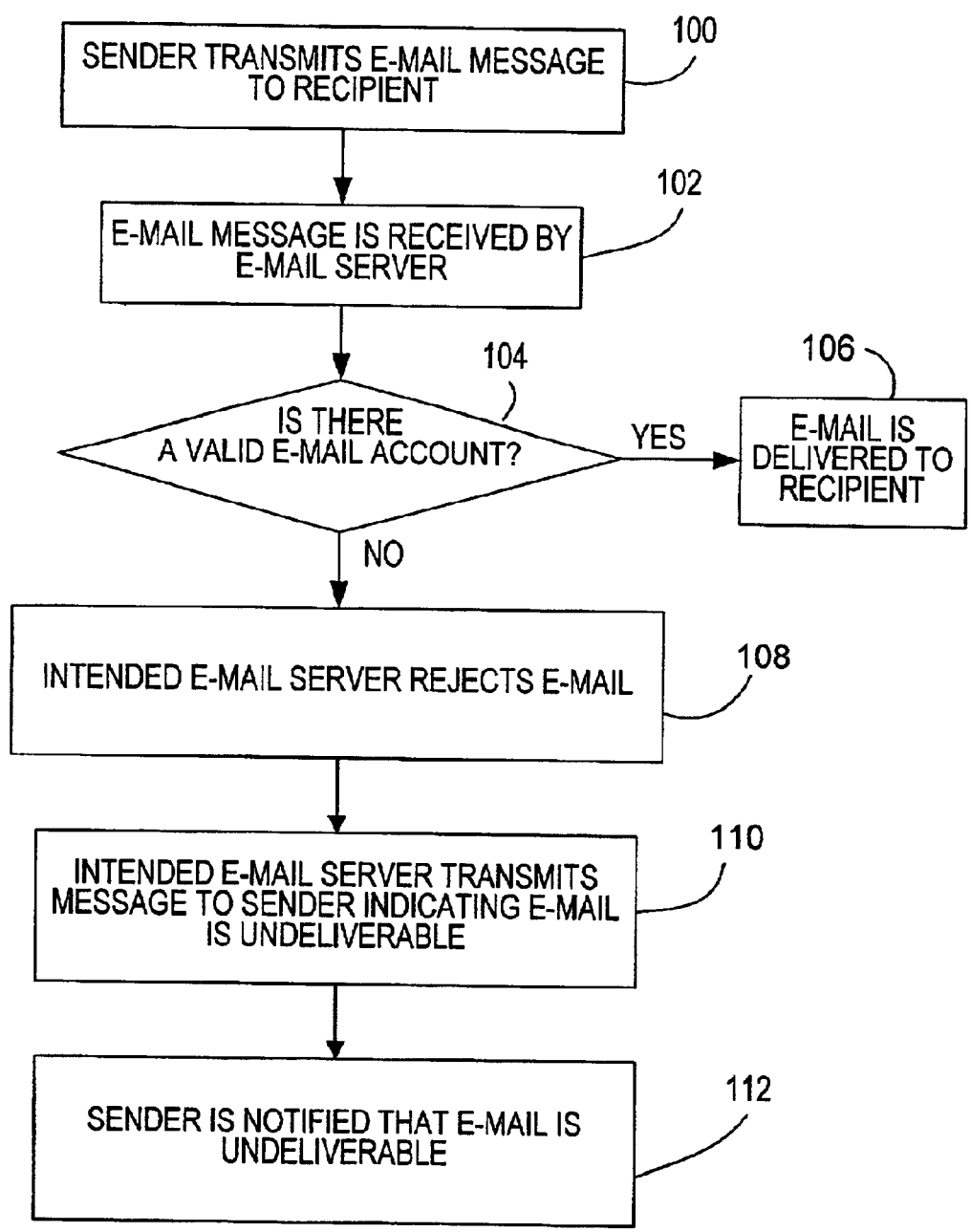
FIGS. 2 and 3 depict flowcharts depicting the operation of the present invention.
Figure 3:
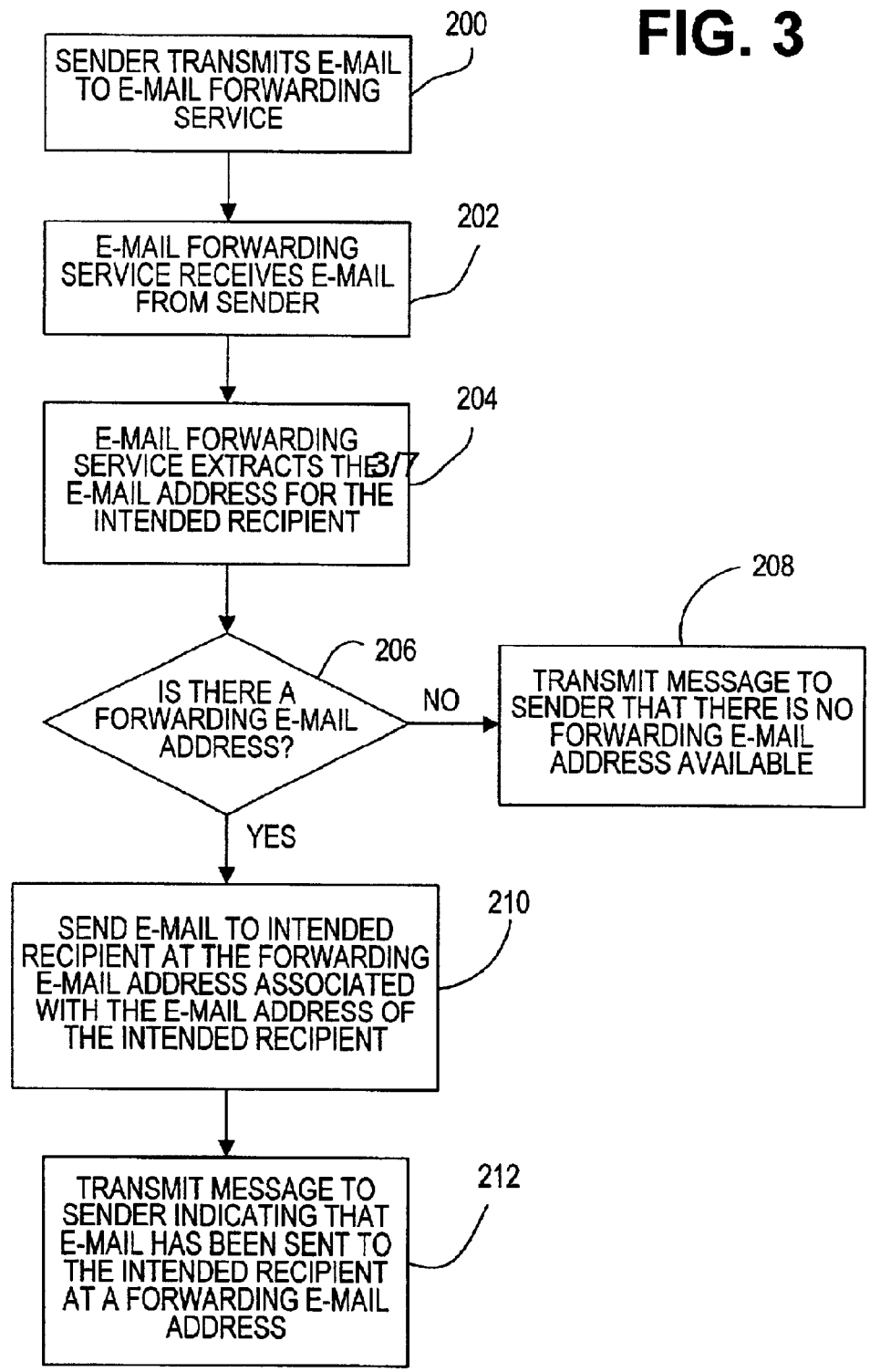

The method of use of system 44 will now be described with reference to FIGS. 2, 3 and 5 in conjunction with FIG. 1. Referring now to FIG. 2, when an e-mail sender 14 desires to transmit a message to a recipient 30 having a known e-mail address (e.g., quine@luv-npi.com) of the recipient, the sender 14 transmits the e-mail message 500 (FIG. 5a) through conventional e-mail protocol, whereby the message is delivered to the identified mail server 26 (e.g., luv-npi.com) of the recipient 30, via the senders ISP server 18 (step 100). The recipient's 30 mail server 26 then receives the e-mail message (step 102), and if the e-mail account is valid (e.g., quine@luv-npi.com) (step 104), the e-mail message is then accessible to the view and thus considered delivered (step 106). If the account is not a valid account (e.g., quine@luv-npi.com) then the identified e-mail server 26 (e.g., luv-npi.com) rejects the request (step 108) and sends a MAIL-DAEMON message 510 (FIG. 5b) to the sender's 14 e-mail server 18 indicating that the message is not deliverable (step 110). The sender's e-mail server 18 then sends a message to the sender 14 that the attached e-mail message is undeliverable.

Since the sender 14 cannot contact the recipient (e.g., quine) via the now defunct e-mail address 54 (e.g., quine@luv-npi.com), the sender 14 is presented with the problem of how to contact the recipient. In order to overcome this problem, the present invention e-mail forwarding system 44 provides a solution by forwarding the e-mail message to a new address so long as the recipient 30 (e.g., quine) subscribes to the forwarding service of the system 44. In the current illustrative example, the recipient (e.g., quine) registers the defunct e-mail address 54 (e.g., quine@luv-npi.com) with the system 44 and instructs the system to forward all messages to a specified forwarding e-mail address 52 (e.g., quinedo@csense.com), as depicted in the look-up table of FIG. 4.

Figure 5C:
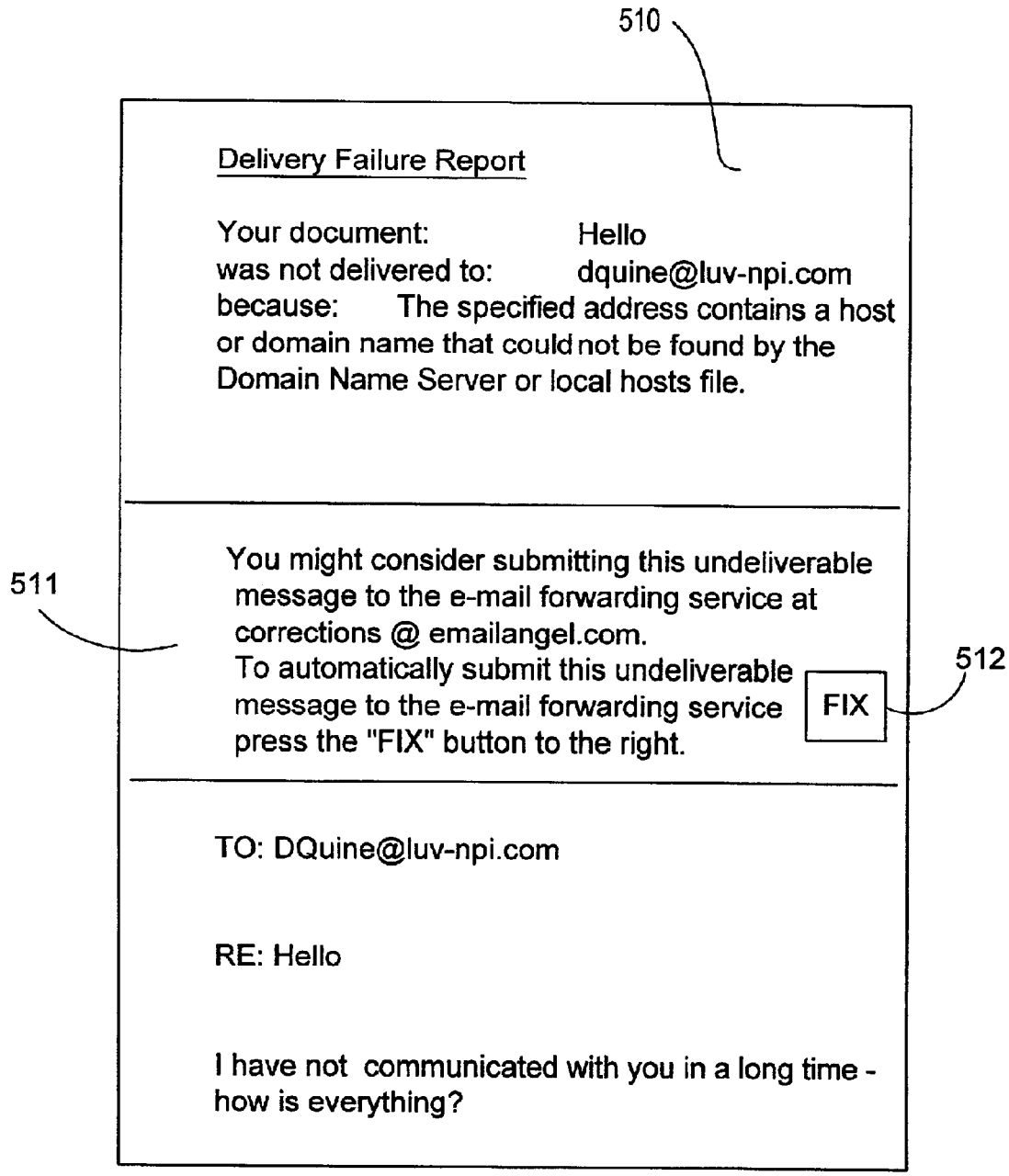

In a preferred embodiment as shown in FIG. 5C, the returned MAIL DAEMON message 510 may further include a text message 511 suggesting that the user consider using an e-mail forwarding service, such as those of forwarding system 44, and provide information on how to submit the undeliverable message to the e-mail forwarding system 44.

Submitting an Undeliverable Message to the E-mail Forwarding System

Returning now to the sender's 14 situation in which the sender 14 still desires to transmit the e-mail message 500 but does not know the correct e-mail address. In accordance with the present invention, the sender 14 now forwards the entire message 510 that was previously sent to the intended recipient's defunct e-mail address (e.g., quine@luv-npi.com), and rejected, to the e-mail address (e.g., corrections@emailangel.com) assigned to the e-mail forwarding system 44 (step 200). The e-mail server 48 (e.g., emailangel.com) that received the message then informs the forwarding system 44 of the receipt of this message and afterwards the forwarding system 44 receives the message from the e-mail server 48 (step 202). The forwarding system 44 then parses message 510 and extracts the intended address for the recipient (e.g., quine@luv-npi.com) from the message (step 204). The forwarding service 44 then does a look-up in table 50 for the intended address (e.g., quine@luv-npi.com) to determine if this address has been registered by a subscriber in the forwarding system 44 (step 206). If no, system 44 sends an e-mail message back to the sender 14 informing the sender 14 that the defunct address of the recipient 30 (e.g., quine@luv-npi.com) is not registered with the forwarding system 44 (step 208). If yes, forwarding system 44, sends the e-mail message 510 addressed to the recipients defunct address 54 (e.g., quine@luv-npi.com) to the recipient subscriber's new e-mail address 52 (e.g., quinedo@csense.com) as prescribed in the look-up table 50 of the forwarding system 44. Preferably, forwarding system 44 then sends an e-mail to the sender 14 indicating that the message original addressed to a defunct e-mail address has now been properly forwarded. As will be discussed further herein, the forwarding service 44 may also hold, or offer to hold, a copy of the message for later delivery if the recipient subsequently registers for the forwarding system 44.

In a preferred embodiment, as shown in FIG. 5C, the returned undeliverable message 510 may include a link or a button 512 which the user can activate to automatically transmit the undeliverable e-mail to forwarding system 44. Such a link or button 512 may include a designation such as "FIX" or "SUBMIT TO FORWARDING SERVICE." Such a link or button 512 may be added into message 510 by using an hyperlink, a Java applet, or any conventional linking mechanism. The link or button 512 may be included in message 510 by the ISP that returns the undeliverable message, or it may be included as an option in the user's e-mail browsing program that becomes available when an undeliverable message is received. The link or button 52 can be a downloaded applet to be run with the user's e-mail application software. For purposes of this embodiment, any kind of link or button may be interchangeable for providing a convenient way for a user to access the service of the e-mail forwarding system 44.

In addition to the form of the message 510 specifically shown in FIGS. 5B and 5C, the message from the user to the forwarding computer may take a variety of forms. As an alternative to forwarding the message returned by the MAIL DAEMON, message 510 can be a forwarded copy of the of the original message 500, or a new message indicating the undeliverable address in the subject line. Message 510 can alternatively be a new message that includes information identifying the rejected e-mail address and a desired message, possibly differing from the message in the original rejected e-mail. Such a new message might be composed using a predetermined template specifically designed to interact with forwarding system 44.

As a further alternative for submitting a message 510 to the forwarding system 44, an INTERNET web page could be used for submitting rejected e-mail addresses and messages. In such an INTERNET embodiment, the user could access a web page that included input fields into which the user could enter an e-mail address for which a forwarding address was desired, as well as any message to be forwarded. The information entered by the user at the web page could then be sent to the forwarding system 44.

Thus, a clear advantage of the present invention e-mail forwarding system 44 is that a sender merely forward a rejected e-mail message to the e-mail address (e.g., corrections@emailangel.com) associated with the forwarding system 44 to determine if the previously rejected message can be forwarded to a proper e-mail address. And if it can, the forwarding system automatically forwards the message to an e-mail address as prescribed by the recipient. Thus, a user of system merely has to forward a rejected e-mail message to forwarding system 44 to utilize its forwarding services. Therefore, no internet access is required, only access to an e-mail server is required which is quite advantageous since many e-mail users only have access to an e-mail server and not an internet server, such as staff employees in corporations and home users who utilize free, or inexpensive e-mail services. Furthermore, in contrast to directory services, the system design preserves recipient privacy by not providing the new e-mail address to the sender.

Dynamic Email Forwarding

In an alternative embodiment of the present invention, the look-up table of the e-mail forwarding system 44 may preferably have dynamic parameters in which a subscriber of system may have an account including one or more disfavored e-mail addresses that are associated with one or more forwarding e-mail addresses. For example, and with reference to FIG. 6, look-up table 60 is shown having three subscriber accounts 62, 64 and 66. In account 62, a subscriber is shown to have listed three disfavored e-mail addresses (e.g., doug@yahoo.com, doug@hotmail.com and doug@obsolete.com) in association with a single forwarding e-mail address (e.g., doug@current.com). Thus, when a user of system 44 uses it to forward e-mail to anyone of the listed disfavored e-mail addresses (e.g., doug@yahoo.com, doug@hotmail.com and doug@obsolete.com) the system 44 automatically forwards the e-mail to the single prescribed forwarding e-mail address (e.g., doug@current.com) regardless of which one the disfavored e-mail addresses (e.g., doug@yahoo.com, doug@hotmail.com and doug@obsolete.com) the e-mail message was intended for.

With reference to account 64, a subscriber is shown to have listed a single disfavored e-mail address (e.g., doug@obsolete.com) in association with three forwarding e-mail addresses (e.g., doug@work.com, doug@home.com and doug@wireless.com). Now, when a user of system 44 uses it to forward e-mail intended for the listed single disfavored e-mail address (e.g., doug@obsolete.com), the system 44 automatically forwards the e-mail message to each one of the prescribed e-mail addresses (e.g., doug@work.com, doug@home.com and doug@wireless.com).

Referring now to account 66, a subscriber is shown to have listed three disfavored e-mail addresses (e.g., doug@yahoo.com, doug@hotmail.com and doug@obsolete.com) in association with three forwarding e-mail addresses (e.g., doug@work.com, doug@home.com and doug@wireless.com). Thus, when a user of system 44 uses it to forward e-mail to anyone of the listed disfavored e-mail addresses (e.g., doug@yahoo.com, doug@hotmail.com and doug@obsolete.com), the system 44 automatically forwards the e-mail message to each one of the prescribed e-mail addresses (e.g., doug@work.com, doug@home.com and doug@wireless.com).

Of course it is to be appreciated that a subscriber of system 44 may maintain multiple accounts whereby a single subscriber may maintain each of the previous described accounts 62, 64 and 66.

Preventing Unwanted Forwarding

In another embodiment of the present invention, the e-mail forwarding system 44 is preferably operative to prevent the forwarding of e-mail messages sent from predetermined senders. It is now to be understood that a subscriber of system 44 may now register the e-mail addresses of senders who are not to have e-mail forwarded to them. That is, when a user (e.g., chrisc@mail.com) forwards an undeliverable e-mail message to system 44, system 44 in addition to determining whether there is an e-mail forwarding address associated with it, system 44 determines if the e-mail being sent from the user (chrisc@mail.com) (i.e., e-mail addresses having specified domain names (e.g., . . . @junk.com)) is to be prevented from using the e-mail forwarding services of the present invention.

Figure 7:
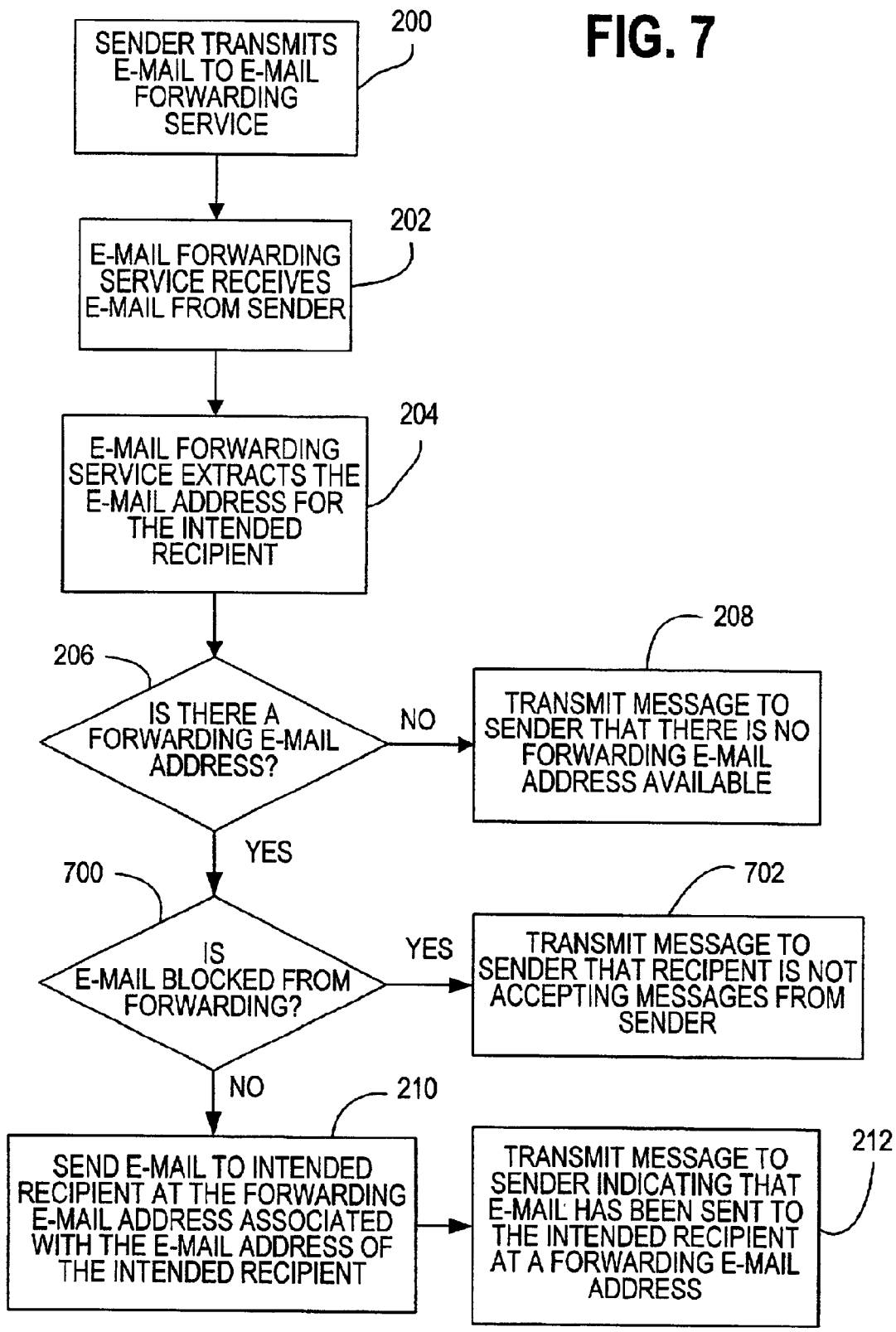
FIG. 7 depicts a flow chart illustrating the steps taken by the present invention e-mail forwarding system for archiving requests for forwarding undeliverable e-mail.

With reference to FIG. 7, and as described above, in step 206 a determination is made as to whether there is a forwarding e-mail address stored in system 44 that is associated with a disfavored e-mail address. In the current embodiment, if there is a forwarding e-mail address associated the aforesaid disfavored e-mail address a determination is then made as to whether the subscriber desires to prevent the sender (e.g., chrisc@mail.com) from forwarding e-mail to the forwarding address (step 700) If yes, then system 44 transmits a message to the sender (chrisc@mail.com) indicating that the recipient will not accept mail from the sender (step 702). If no, forwarding system 44, sends addressed to 54 to the subscriber's e-mail forwarding address 52 as prescribed in the look-up table 50 of the forwarding system 44.

It is to be appreciated that in step 702 the system 44 may transmit any type of message back to the sender if the sender's e-mail address is prescribed in system 44 for transmitting such a message in the event that the sender attempts to forward e-mail to the subscriber. For example, such a message could read: "I have been waiting for you to write me, please forward you message directly to doug@newaddress.com".

Archiving of Unsuccessfully Forwarded Messages

In another embodiment of the present invention, the e-mail forwarding system may be configured to include an archival database of unsuccessful requests for forwarding undeliverable e-mail messages. As was discussed above in reference to FIG. 3, when the e-mail system 44 determines that there is no e-mail forwarding address in its look-up table 60 for a disfavored e-mail address (step 206), a notice is sent to the user indicating the non-inclusion of an e-mail forwarding address and thus the e-mail message was not forwarded (step 208). One probable reason for this situation is that the owner of the disfavored e-mail address never subscribed to e-mail forwarding services of system 44. Thus, even if this owner shortly thereafter subscribes to the e-mail forwarding services of system 44, the owner is never informed of this previous request and may consequently not receive e-mail messages of possible significance to the subscriber.

However, this problem is solved by providing an archival database in the e-mail forwarding system 44, which database preferably stores parameters of unsuccessful requests for forwarding e-mail messages. Such parameters may include any of those contained in the exemplary e-mail message of FIG. 5b as transmitted by a user to the e-mail forwarding system 44 (e.g., To:Dquine@luv-npi.com and ChrisC@PB.com). Alternatively, the archival database may contain all the parameters contained in the (e-mail message of FIG. 5B). The sender is advised that there is no current registration available for this address but that the message may be held pending a future registration at which time the message will be released to the recipient. The sender is given the option of allowing the message to remain pending or the option of withdrawing the message at any time before it is delivered (e.g. press reply on this message to cancel message delivery). This allows the sender to withdraw a message if it becomes obsolete or moot.

Figure 8:
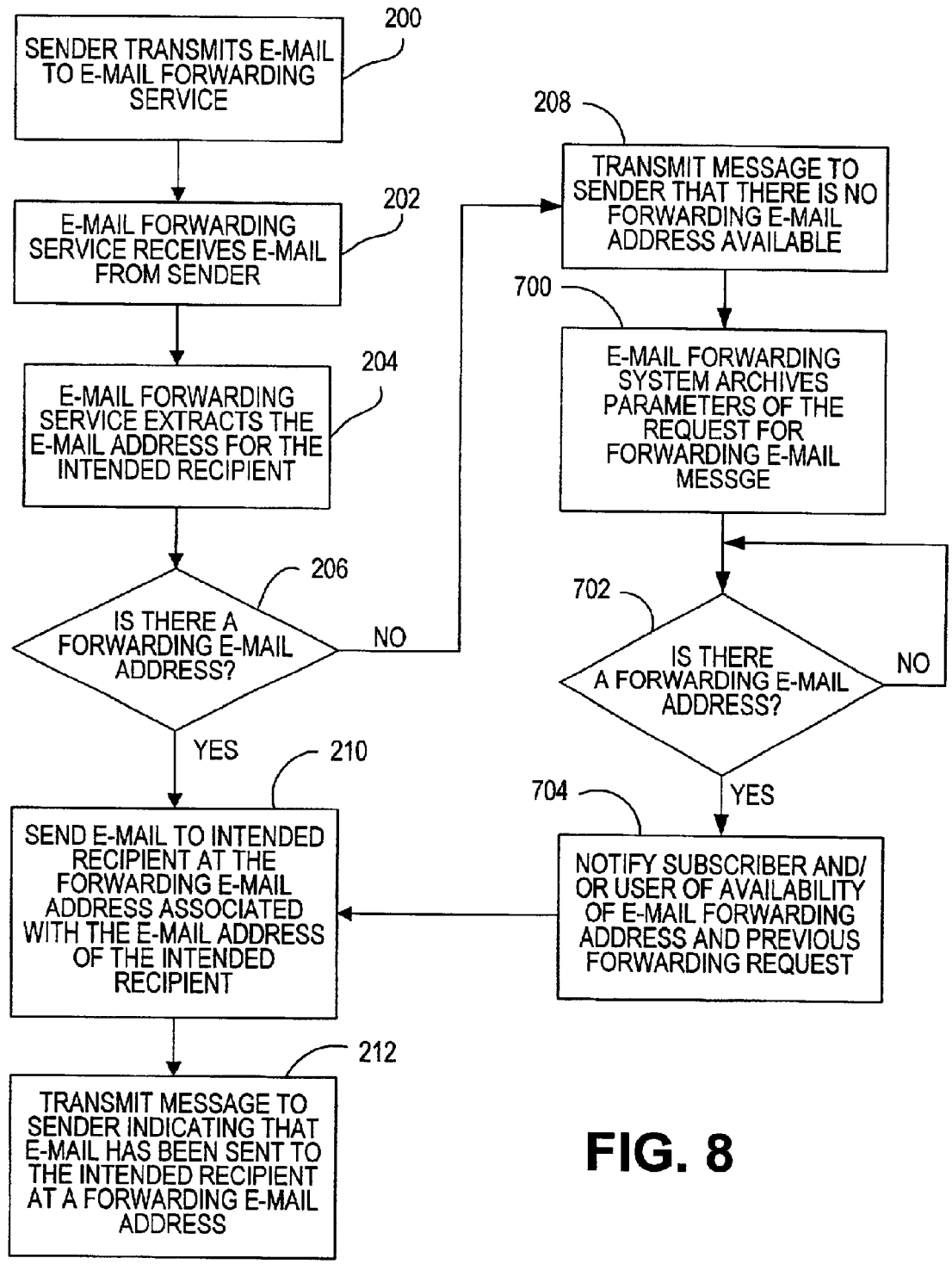
FIG. 8 depicts a flowchart illustrating the operation of the present invention including the blocking feature for forwarding e-mail.

With reference now to FIG. 8, after there has been a determination that there is no forwarding e-mail address (step 208), the e-mail forwarding system 44 archives parameters of the disfavored e-mail message preferably in a database implemented in the e-mail forwarding system 44 (step 800). Next, after each subscriber registers a disfavored e-mail address with system 44, system 44 checks its aforesaid archival database to determine if there is a match between a newly registered disfavored e-mail address and an archived disfavored e-mail address (step 802). If yes (step 804), system 44 notifies the subscriber that there was already a previous request by a user of the system 44 to forward e-mail to the newly registered disfavored e-mail address. System 44 may preferably notify the subscriber of the requesting user's e-mail address as well as the message that was attempted to be forwarded.

Alternatively, if there is such a match, system 44 may notify the requester, via e-mail, that a forwarding e-mail address has now been registered with the system that matches a previous request of the user and the user should once again use the services of system 44 to now successfully forward the e-mail message from a disfavored e-mail address to a forwarding e-mail address. This is advantageous in that only a minimal amount of information needs to be stored in the archival database. Also, it gives the user the option of forwarding a message since a message may become moot after the passage of a certain amount of time and thus the user may not want to forward such a message to the newly registered disfavored e-mail address.

If there is no match for a particular new subscriber, system waits again for a newly disfavored e-mail address to make the determination for a match between a newly registered disfavored e-mail address and those stored in the archival database (step 802).

Alternatively, the system 44 may be configured to make the determination for matches for newly registered disfavored e-mail address[es] and those stored in the archival database after a passage of a prescribed period of time (e.g., every: hour, day, week, month . . . etc.) and thus does not have to make such a determination each time a newly disfavored e-mail address is registered with the system 44.

In another alternative embodiment, the new registration need not identify a disfavored address or a corresponding forwarding address. Undeliverable e-mail sent to a previously non-existent address can be automatically held. Then when the new address is created and registered with the e-mail forwarding system 44, then the e-mail forwarding system can check to see whether there are any pending messages being held for the previously non-existent address. Such an arrangement may be used in a situation where an organization such as a corporation registers all of the e-mail accounts under its control, and e-mail addresses for new employees may be registered, even there is no disfavored address or forwarding address. As was noted previously, when a new employee joins a company there is often a delay before an e-mail account can me opened. During the delay period, people who are aware of the new employee may attempt to send e-mail messages. Where previously those premature messages might have been lost, under the current embodiment, those messages sent to the previously nonexistent account can be archived and then forwarded to the new employee when the account is activated and registered.

E-Mail Address Cleansing/Hygiene

Figure 9:
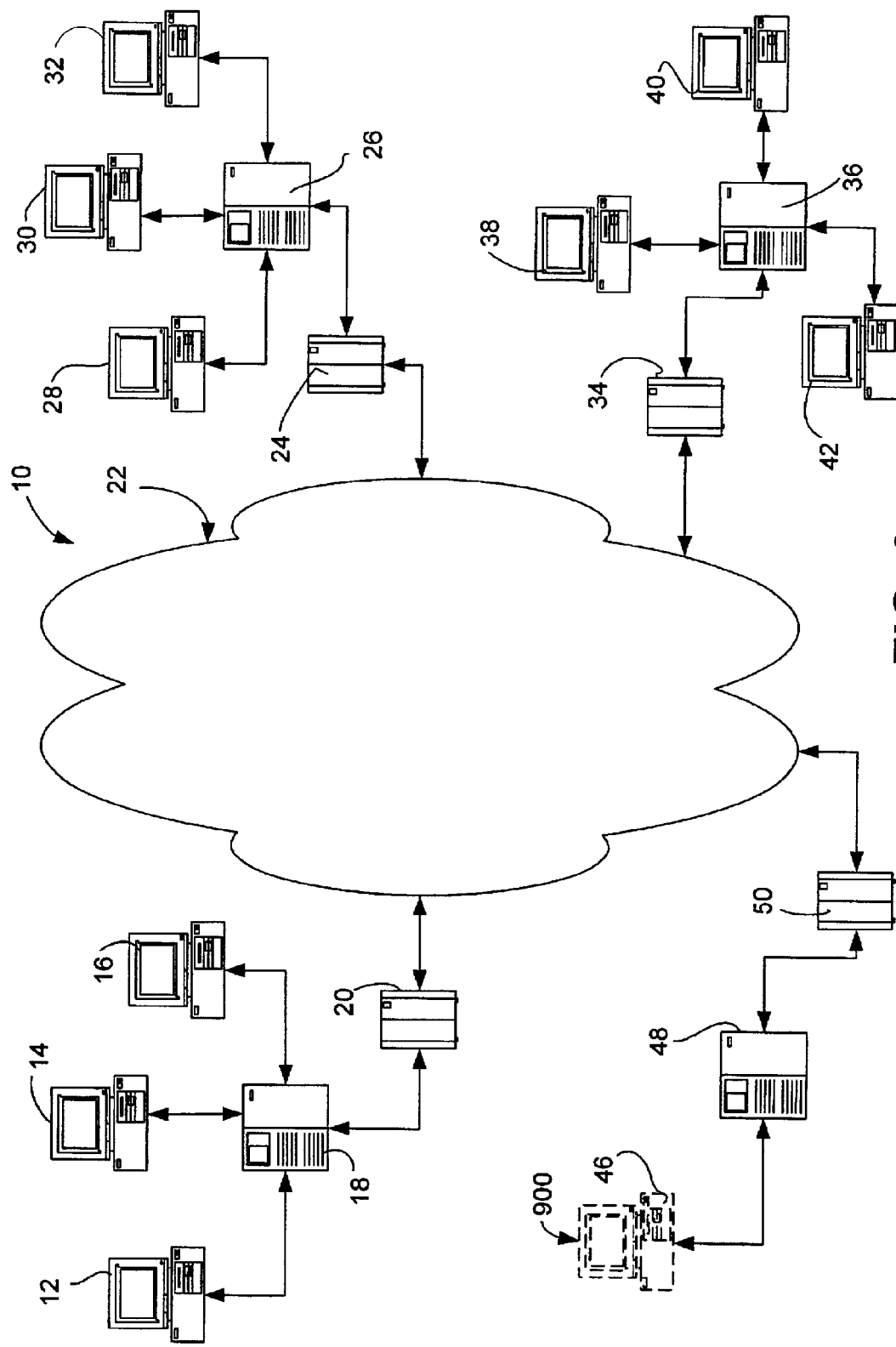
FIG. 9 depicts an alternative embodiment electronic of the e-mail messaging system of the present invention.

With reference now to FIG. 9, another embodiment of the present invention is depicted wherein there is shown messaging system 900 having the capabilities and operational features of the above-described messaging forwarding system 44 of FIGS. 1–5 but with the added capabilities of being able to correct or suggest a correct e-mail address. An example being the situation when a sender wants to send an e-mail to Doug Quine, and the senders knows that Doug Quine works at Pitney Bowes and that he has an e-mail address at Pitney Bowes but does not know the precise e-mail address but nevertheless wants to send an e-mail to Doug Quine at Pitney Bowes. Thus the sender then goes ahead and transmits an e-mail to Doug Quine using an educated guess that Doug Quine's e-mail address is Douglas.Quine@pb.com (when it actually is quinedo@pb.com). In one embodiment described below, when the sender transmits the e-mail to Doug.Quine@pb.com, the messaging forwarding system 900 is able to suggest sending the e-mail to quinedo@pb.com.

Preferably, the messaging system 900 operates within an enterprise (e.g., having a single computer or within an intranet) or may operate in the public domain where non-affiliated users may utilize the information to improve address hygiene with the result being that digital document delivery success is enhanced. In essence, and as described in further detail below, the present invention enables the successful delivery of an e-mail to a person without knowing the person knowing the complete or correct e-mail address. In a first embodiment for messaging system 900 and illustrated in FIG. 9, messaging system 900 is to be understood to operate in the public domain with that of system 44 shown in FIG. 1.

In reference to FIGS. 10a and 10b, its method of operation will now be described. First, when an e-mail sender 12 desires to transmit a message to a recipient 40 having either what is thought as a known e-mail address, or an educated guess of the recipient's e-mail address (e.g., Douglas.Quine@pb.com) as described above, the sender 12 nevertheless transmits the e-mail message through conventional e-mail protocol, whereby the message is delivered to the identified domain name mail server 36 (e.g., pb.com) specified in the recipient's e-mail address (e.g., Douglas.quine@)pb.com), via the senders ISP server 18 (step 600). The specified domain name mail server 36 then receives the e-mail message (step 602), and if the e-mail account is not recognized by the domain name mail server 36 (e.g., Douglas.quine@pb.com) (step 604), then the specified domain name mail server 36 rejects the request and sends an undeliverable message (e.g., a MAIL-DAEMON message) back to the sender 12, via the sender's e-mail server 18 indicating that the message is not deliverable (step 610). As described above, the sender's e-mail server 18 then sends the message to the sender 12 that the attached e-mail message is undeliverable.

Figure 10A:
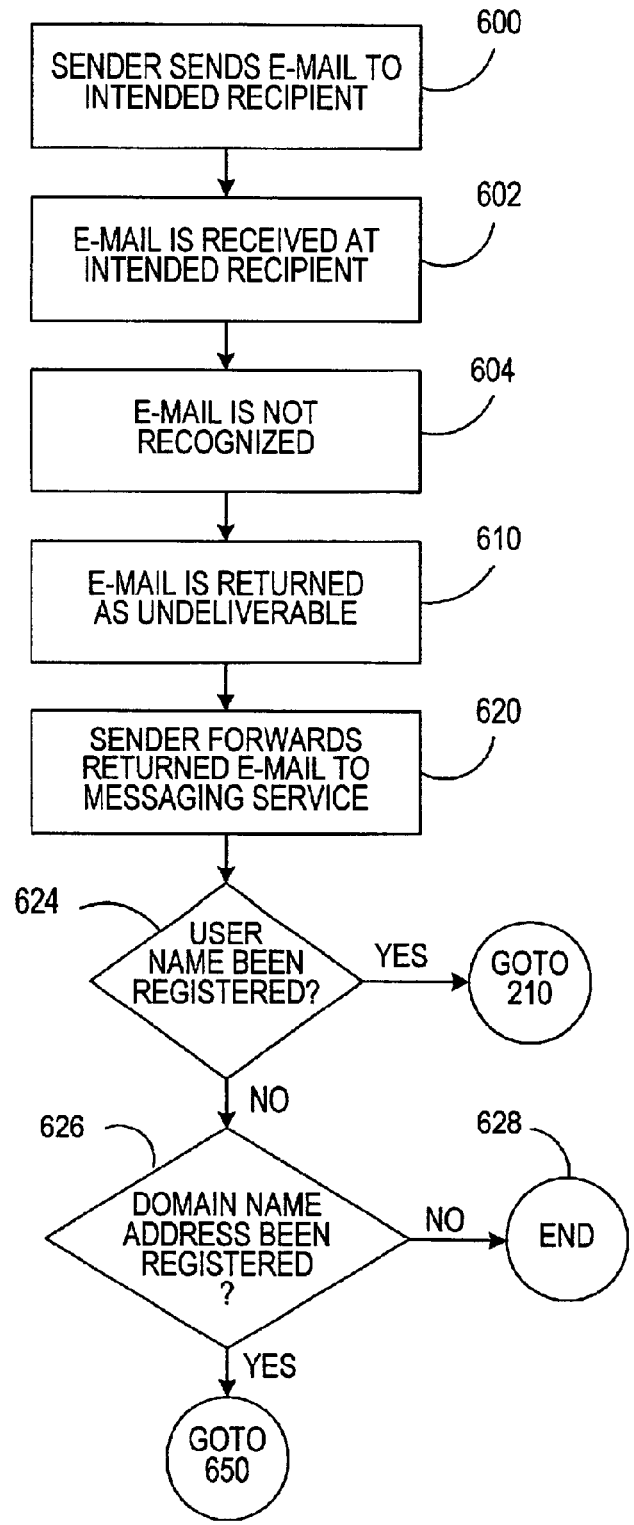
FIGS. 10a and 10b depict the method of operation for the e-mail messaging system of FIG. 9.

With continuing reference to FIG. 10a, since the sender 12 was unsuccessful in delivering the e-mail message to the recipient, the sender then forwards the e-mail message to the messaging forwarding system 900 of the present invention (step 620). The messaging forwarding system 900 then receives the forwarded e-mail message (step 622), and as described above, determines if a forwarding address has been registered for the undeliverable forwarded e-mail message (step 624). If yes, the above described process of step 210 is then performed. If no, a determination is then made as to whether the domain name address (e.g., pb.com) of the undeliverable e-mail address (e.g. Douglas.quine@pb.com) has been registered with the messaging forwarding system 900 (step 626). If no, then messaging system 900 then preferably sends a message back to the sender that it is unable to provide a forwarding e-mail address for the undeliverable e-mail address (step 628).

Figure 10B:
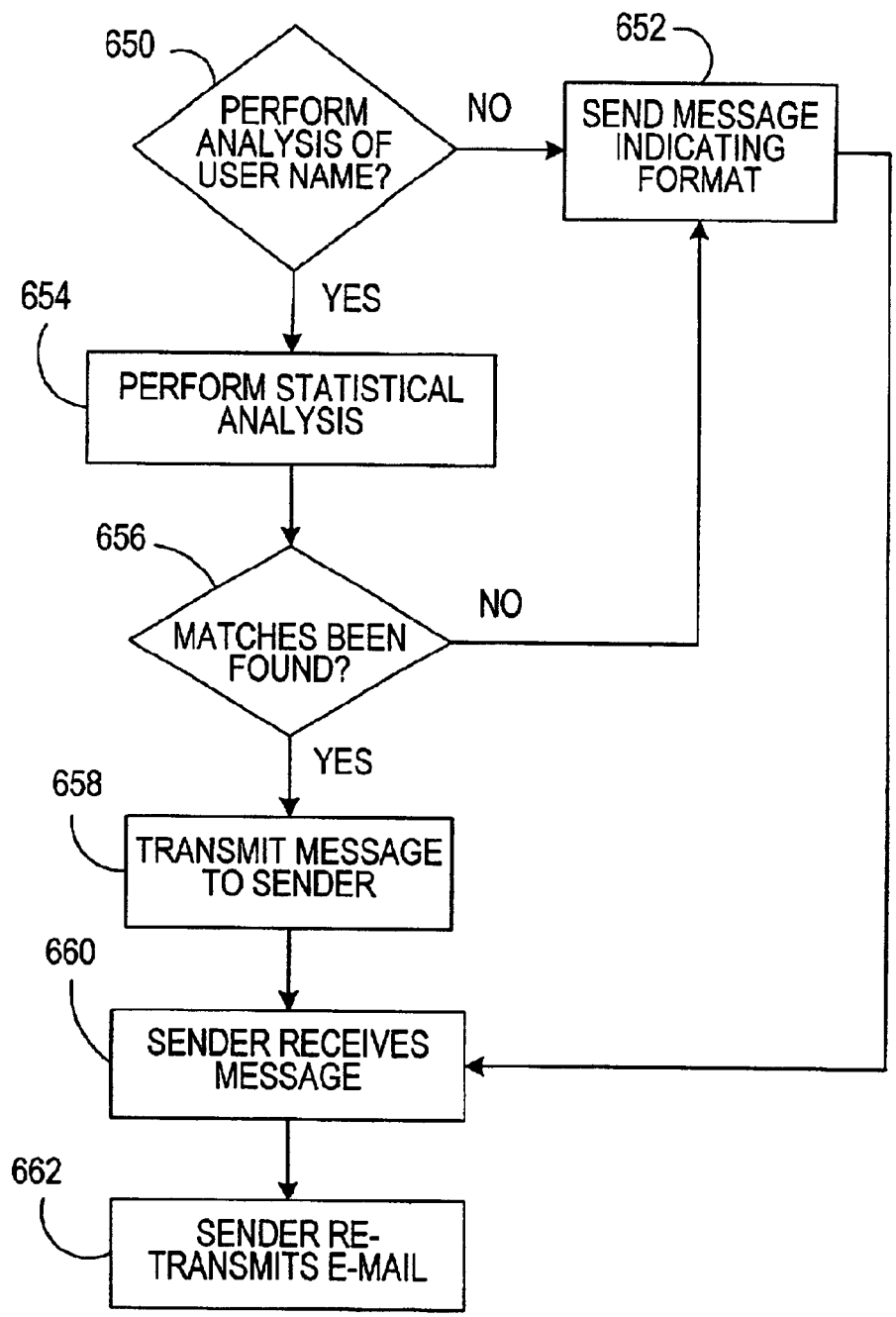

If yes, and with reference now to FIG. 10b, a determination is made as to whether an analysis to determine a "closest match" is to be performed (step 650). As will be described further below, this "closest match" determination is essentially the performance of an analysis to find the closest match to the username (e.g., douglas.quine) of the undeliverable e-mail in comparison to those username that are pre-registered with the messaging system 900 in association with the subject domain name address (e.g., pb.com). Preferably, and as further described below, when the administrator of the mail server 36 opens an account with the present invention messaging system 900, the administrator decides whether to list all current usernames associated with the subject domain name address (e.g. pb.com) so as to enable the performance of the closest match determination. If no "closest match" determination is to be performed (e.g., either the administrator of the subject domain name address has decided not to list all associated username, or has decided not to enable this feature in the messaging system) then the messaging system 900 preferably transmits an e-mail message back to the sender 12 indicating the format for usernames followed for that domain name address (e.g., pb.com) (step 652). An example of such a message is:

THERE IS NO KNOWN E-MAIL ADDRESS FOR DOUGLAS.QUINE(@PB.COM—HOWEVER, THE FORMAT FOR USERNAMES RESIDING AT PB.COM IS TO USE THE FIRST SIX CHARACTERS OF THE LAST NAME FOLLOWED IMMEDIATELY BY THE FIRST TWO CHARACTERS OF THE FIRST NAME—FOR EXAMPLE: MR. TOM WATSONER WOULD BE WATSONTO@PB.COM AND MS. ADELE ZON WOULD BE ZONAD@PB.COM—TRY TO REFORMAT YOUR USERNAME IN ACCORDANCE WITH THIS FORMAT AND RE-TRANSMIT YOUR E-MAIL MESSAGE—GOOD LUCK.

If yes, that is an analysis is to be performed for the undeliverable e-mail address (e.g., Douglas.quine@pb.com), then an analysis of the username portion (e.g., Douglas.quine@) of the undeliverable e-mail address (e.g., Douglas.quine@(pb.com) is performed to determine a closest match (based upon prescribed criteria) to a username(s) from all the usernames registered with the messaging system 300 that are associated with the domain name (e.g., pb.com) of the undeliverable e-mail address (step 654). A determination is then made as to whether a closest match(es) has been made (step 656). If, no then the process goes to the above described step 652. If yes, then a message is sent to the sender 12 indicating the closest match(es) that have been determined (step 658). An example of such a message is:

IT HAS BEEN DETERMINED THAT THE CLOSEST MATCH FOR DOUGLAS.QUINE@PB.COM IS QUINEDO@PB.COM. IT IS SUGGESTED THAT THE E-MAIL MESSAGE BE RE-SENT TO THIS E-MAIL ADDRESS.

When the sender 12 receives this e-mail message suggested the closest match alternative e-mail address (e.g., quinedo@pb.com) (step 660) the sender may then retransmit the once undeliverable e-mail message to the closest match e-mail address (step 662).

Automatically Sending Undeliverable Messages to the E-Mail Forwarding System

Figure 11:
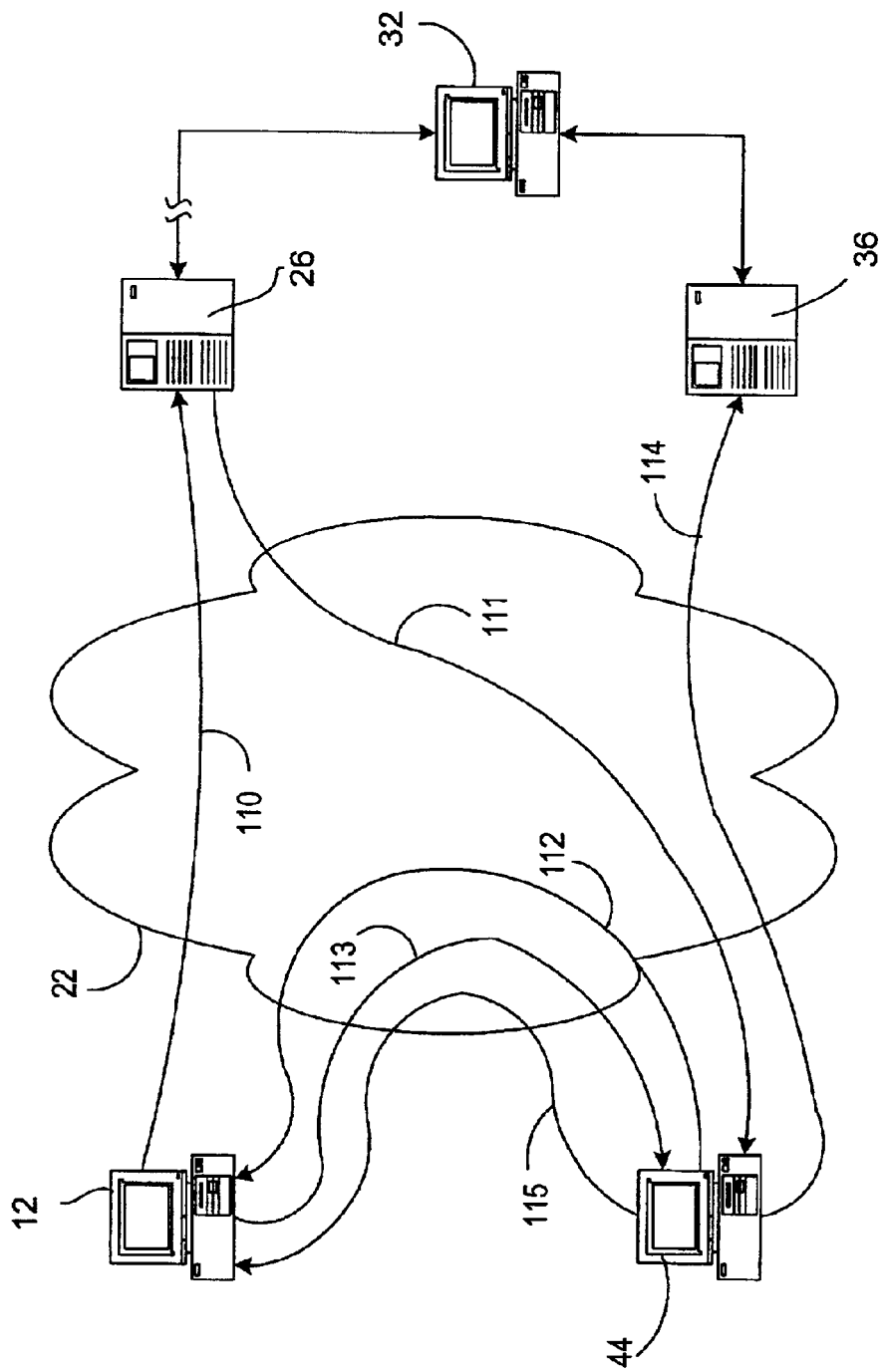
FIG. 11 depicts an embodiment for automatic directing of undeliverable messages to the e-mail forwarding system.

In another embodiment of the invention, the server associated with the undeliverable e-mail address automatically sends the undeliverable e-mail to the forwarding system 44. To illustrate this embodiment, FIG. 11 depicts a variation of the system shown in FIG. 1. In FIG. 11, routers 20, 24, 34 and 50 and internet service providers 18 and 48 are not shown for convenience, but may nevertheless be present in the embodiment described in this section. Arrows 110–115 depict conceptual paths of various communications at different stages of the embodiment described below. FIG. 11 also varies from FIG. 1 in that destination site 32 no longer has a valid e-mail address associated with ISP 26, as depicted by the broken line between the two. Instead destination site 32 has become associated with a different ISP 36 for which it has a new e-mail address. In accordance with the present invention, the owner of destination site 32 has registered with the forwarding system 44 to associate the now defunct e-mail address for ISP 26 to the new e-mail address at ISP 36.

As shown in FIG. 11, a user at originating site 12 sends, via path 110, an e-mail intended for the recipient at destination site 32 but that is addressed to the old defunct address at ISP 26. In accordance with the present embodiment, the e-mail server protocols at ISP 26 are modified to forward the undeliverable e-mail message to forwarding system 44 via path 111.

As a further optional variation of this embodiment, the e-mail originated at the originating site 12 may include a flag indicating whether or not the user wishes to have the message automatically forwarded to the forwarding system 44 if the address turns out to be undeliverable. The protocols of ISP 26 can be modified to check the flag when the e-mail is undeliverable, to determine the sender's preference, and to forward or return the e-mail accordingly. The modification to the protocols of ISP 26 may take a similar form to the known modification to implement delivery confirmation functionality when e-mail includes a flag indicating the delivery confirmation is desired.

Once the undeliverable message has been sent to the forwarding system 44, the forwarding system operates as described herein to determine whether there is a forwarding address associated with the undeliverable e-mail. If there is an associated forwarding address, then the forwarding system 44 can send the e-mail to the appropriate address via path 114.

However, in the preferred embodiment of the invention, the forwarding system 44 first communicates with the sender at originating site 12 via path 112 informing the user whether a forwarding address has been identified. If a forwarding address has been found, the user may communicate via path 113 back to the forwarding system 44 indicating whether or not the sender desires to have the message forwarded. Forwarding system 44 is programmed such that if the user indicates that the e-mail should be forwarded then the e-mail is forwarded to the new address via path 114. Finally, a confirmation of the activities of forwarding system 44 with regard to the subject e-mail can sent back to the user via path 115.

It should be noted that in this embodiment, and in any other embodiment, it is not necessary that ISP 26 and ISP 36 be different physical servers. The invention is equally applicable to the situation where the new forwarding address is associated with a disfavored address with the same ISP. For example, the forwarding system 44 could act to associate a forwarding address, such as quinedo@pb.com, that was associated with a disfavored address, such as Douglas.guine@pb.com, both addresses being served by the Pitney Bowes company e-mail server.

Corporate Registration of E-Mail Addresses with the E-Mail Forwarding System

A particularly advantageous embodiment of the present invention may be implemented by a corporation, or any large organization, wishing to centralize, expedite, and control delivery its e-mail communications. In this embodiment, a corporation having an e-mail system can register all of the e-mail addresses under its control with forwarding system 44. When a corporation registers for the services of the forwarding system 44, efficient bulk uploads of e-mail address information, address format information, domain name information may be implemented. This capability allows corporations who have changed name formats (e.g. QuineDo@pb.com becomes Douglas.Quine@pb.com) or domain names due to mergers (e.g. Jim.Jones@bought.com becomes Jim.Jones@buyer.com) to have mail addressed to their disfavored e-mail address redirected to their current addresses. Also, a large scale influx of e-mail forwarding data from corporations and other large organizations helps bring the data mass for the present invention to a level that allows a greater level of usefulness to the e-mailing public. As changes occur in the organizations and forwarding addresses become necessary, whether from changing employees, changes to domain names, or changes to naming formats, then the changes for the associated addresses can be uploaded and implemented by the forwarding system 44. Under this embodiment, domain owners can also upload changes to domain addresses or naming formats in order to expedite the e-mail address cleansing and hygiene procedures described herein, to allow quicker and more accurate delivery of misaddressed e-mail messages.

Under a preferred embodiment, domain owners can also provide rules to be implemented by forwarding system 44 that control whom is allowed to request e-mail forwarding services, and the nature of forwarding that may be allowed. It is generally understood that corporations assert proprietary control over the e-mail sent and received from their respective domains. For example, a corporate domain owner may wish to prohibit former employees from using the present invention to register their former corporate e-mail address in order to have their e-mail forwarded to their e-mail addresses at their new jobs. Such a concern would be understandable, since communications to the old company address may include sensitive information that should no longer be available to the former employee.

Accordingly, forwarding system 44 can be programmed with a rule to disallow registration of corporate e-mail addresses for forwarding unless the registration is received from an authorized representative. As an alternative, forwarding system 44 could be programmed with a rule to allow registration and forwarding a corporate e-mail address, but only to another address with the same domain. For traditional consumer ISPs, such as AOL, where the ISP does not assert per se ownership of the content of e-mail messages of its subscribers, no rules may be implemented.

Another rule may designate different format responses based on submissions to addresses belonging to different corporations who wish to have different custom messages relayed back to the senders of mail to the respective corporations. Thus Pitney Bowes might respond that "your correspondent is unable to respond at this time, may we forward your message to his/her covering manager" while IBM might respond that "your correspondent is no longer at the company, may we forward the message to his/her replacement".

The functionality could be achieved by parsing the domain from which the message was being relayed (PB.COM or IBM.COM) and then implementing the company specific responses accordingly. Alternatively, different companies may submit undeliverable e-mail to different submission addresses of the forwarding system 44.

Forwarding Messages to a Successor Employee

In another embodiment of the invention particularly useful to a corporation, or large organization, the forwarding system 44 can be used to forward e-mail directed to a former, or reassigned, employee to an appropriate successor employee. E-mail sent to former employees may include important business information, but under conventional arrangements such information may be simply thrown away rather than face the potential liability and expense of reviewing and sorting e-mail sent to former employees. The preferred embodiment provides a way for a successor to a former, or reassigned, employee to receive business related e-mail from the defunct e-mail address, while maintaining privacy of the former employee and avoiding manual sorting.

Figure 12:
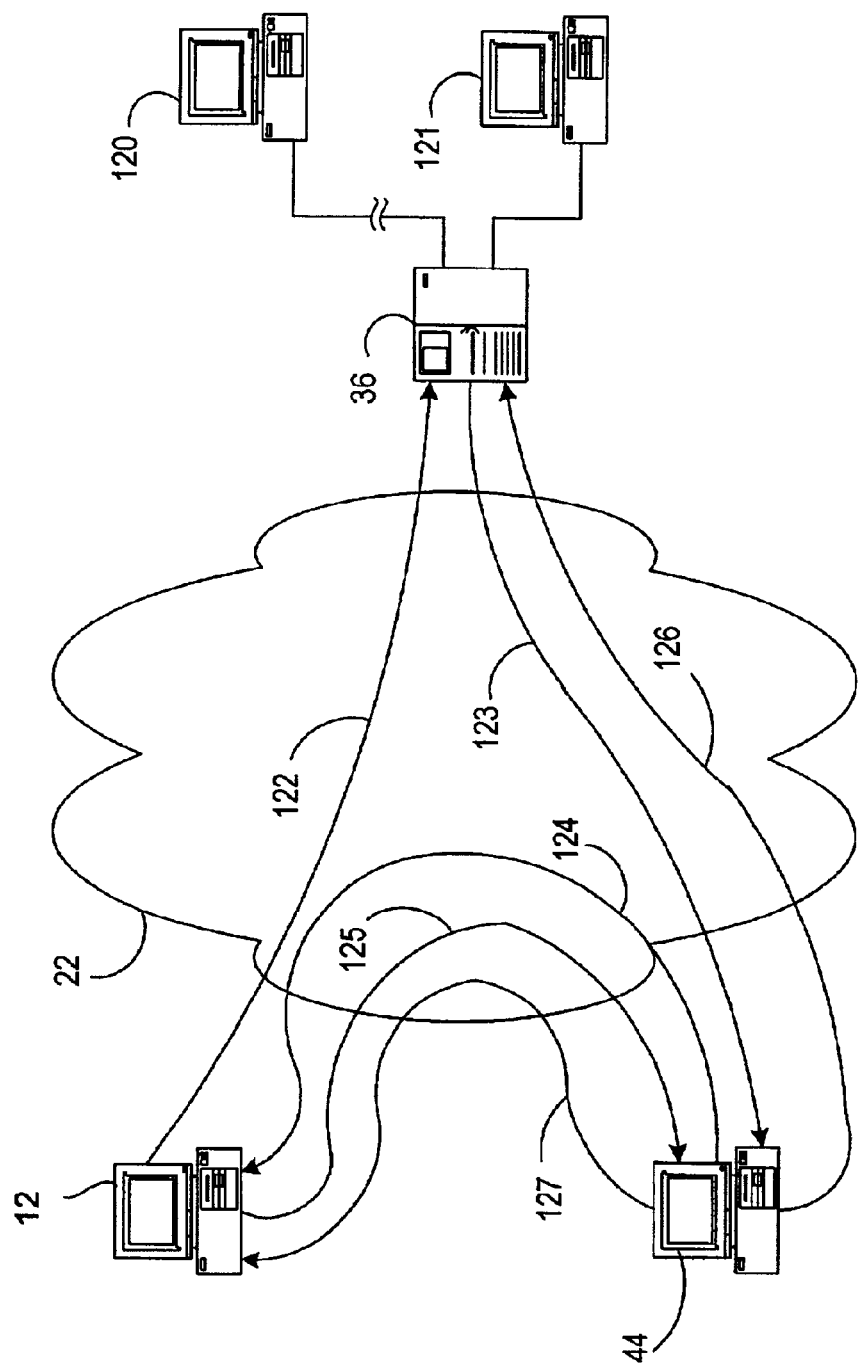
FIG. 12 depicts an embodiment for forwarding of messages to an employee who is the successor to an employee with a disfavored e-mail address.

To illustrate this embodiment, FIG. 12 depicts a variation of the system shown in FIG. 1. In FIG. 11, routers 20, 34 and 50 and internet service providers 18 and 48 are not shown for convenience, but may nevertheless be present in the embodiment described in this section. Arrows 122–126 depict conceptual paths of various communications at different stages of the embodiment described below. In the current embodiment, ISP 36 is a corporate owned e-mail server for the corporation's domain name. FIG. 12 also includes destination sites 120 and 121 that have e-mail addresses associated with the corporate e-mail server 36. Destination site 120 has a defunct e-mail address associated with a former employee. However, in accordance with the present invention the defunct address for destination site 120 has been registered with forwarding system 44 to associate it with the e-mail address of a successor employee at destination site 121.

As shown in FIG. 12, a user at originating site 12 sends, via path 122, an e-mail intended for the former employee recipient at destination site 120 but the e-mail is not deliverable because the e-mail address of the former employee is no longer valid. In accordance with the present embodiment, the server at ISP 36 forwards the undeliverable e-mail message to forwarding system 44 via path 123.

As a further optional variation of this embodiment, the e-mail originated at the originating site 12 may include a flag indicating whether or not the user wishes to have the message automatically forwarded to the forwarding system 44 if the address turns out to be undeliverable. The protocols of ISP 36 can be modified to check the flag when the e-mail is undeliverable, to determine the sender's preference, and to forward or return the e-mail accordingly.

Once the undeliverable message has been sent to the forwarding system 44, the forwarding system operates as described herein to determine whether there is a forwarding address associated with the undeliverable e-mail. In this case, the e-mail address for the successor employee at destination site 121 has been associated with the undeliverable address and the forwarding system 44 can send the e-mail to the appropriate address via path 126.

However, in the preferred embodiment of the invention, the forwarding system 44 first communicates with the sender at originating site 12 via path 124 informing the user that the original addressee is not available, but that the message can be forwarded to a successor employee if so desired. The user may then communicate via path 125 back to the forwarding system 44 indicating whether or not the sender desires to have message forwarded to the successor. Forwarding system 44 is programmed such that if the user indicates that the e-mail should be forwarded then the e-mail is forwarded to the new address via path 126. Finally, a confirmation of the activities of forwarding system 44 with regard to the subject e-mail can sent back to the user via path 127.

The user has several possible channels to communicate their intentions to the invention regarding treatment of a pending message:

a/ html hot buttons in the message that given options to FORWARD or CANCEL;

b/ instructions in the confirmation message to transmit the message to one address to instruct forwarding or another address to cancel forwarding;

c/ Internet hot links in the message that the user can go to that cause the message to be released or cancelled.

By virtue of the forwarding system's 44 consultation with the user as to whether the message should be forwarded to the successor, private or business irrelevant messages meant for the former employee need never be reviewed or sorted by the corporation. Accordingly, messages that are determined by the user to be relevant to the successor employee and to the business will be delivered.

Sharing Corrected Address Information Among Users

In the preferred embodiment, the e-mail forwarding system 44 will not notify the user of the forwarding address, unless specifically authorized by the registrant. However, if a sender affirmatively wishes to know the address correction for the forwarding address, the sender may include an address correction request in the forwarded message, asking the recipient to release the address correction when receiving the forwarded message. The recipient may also agree to allow the sender to provide the corrected address to other potential senders. A sender may offer to pay the addressee or an authorized third party to provide information about the corrected address. Such a system of passing along information about corrected addresses may be useful in a situation where the addressee remembers to inform one on-line biller of the new address to replace a defunct one, but neglects to inform other billers. By authorizing billers to share the new e-mail address, billers can more efficiently continue to send the on-line billing information to their customers, even when the customer e-mail addresses have changed.

Security

An essential feature of this invention is the recognition that it is desirable to verify ownership of addresses that a user attempts to register. A confirming message is sent to the OLD address and the NEW address seeking verification that the owner of that address intended to be registering with the forwarding system 44. The message contains an encrypted security code to prevent someone from faking the response message. If the registrant does indeed confirm ownership and the encrypted message is authenticated then the account is fully activated. Otherwise, the account shows as UNVERIFIED and senders are cautioned that messages are being forwarded to an address that has NOT been authenticated.

In summary, an e-mail forwarding system having a dedicated e-mail address for automatically forwarding e-mail has been described. Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method to forward messages in an organization having an e-mail system wherein messages that are sent to a departed member's e-mail address are forwarded to a successor member's e-mail address, the method comprising the steps of:

associating the departed member's disfavored e-mail address with the successor member's e-mail address as a corresponding forwarding address in an e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

sending a forward confirmation request, indicating that the message will be forwarded, to a message originator; and waiting until a forwarding confirmation authorization is received from the message originator before initiating the forwarding step and forwarding at least a portion of the received message from the e-mail forwarding computer to the associated forwarding e-mail address.

2. The method as recited in claim 1 wherein the step of receiving said messages further comprises:

receiving said messages as redirected to the electronic address of the e-mail forwarding computer by a server associated with a domain address of the disfavored e-mail address.

3. The method as recited in claim 1 wherein the step of providing an electronic address includes providing an Internet web site for inputting messages including disfavored e-mail addresses; and the step of receiving said messages includes receiving said messages from the Internet web site.

4. The method of claim 1 further including the steps of:

including an activatable link along with the forwarding confirmation request, wherein the activatable link will automatically send the forwarding confirmation authorization to the e-mail forwarding computer when activated by the message originator.

5. The method as recited in claim 1 wherein the step of associating a plurality of disfavored e-mail addresses further comprises:

receiving a forwarding address request indicating a disfavored e-mail address;

sending an address change confirmation request to the disfavored e-mail address;

receiving an address change confirmation response;

authenticating the address change confirmation response; and storing the forwarding e-mail address and associated disfavored e-mail address for the forwarding address request for which an authenticated address change confirmation response is received.

6. The method of claim 5 wherein the step of authenticating includes identifying that the address change confirmation response came from the disfavored e-mail address.

7. The method of claim 5 wherein:

the steps of sending an address change confirmation request and authenticating the address change confirmation response use encryption verification.

8. The method of claim 5 further comprising the steps of:

identifying unverified forwarding e-mail addresses for which no authenticated address change confirmation response was received;

when the received message includes a disfavored e-mail address with an unverified forwarding e-mail address, sending a forward confirmation request, indicating that an unverified forwarding e-mail address has been determined, to a message originator; and waiting until a forwarding confirmation authorization is received from the message originator before initiating the forwarding step.

9. The method of claim 1 further comprising the steps of:

linking an address domain name to at least one forwarding rule; and the step of associating a plurality of disfavored e-mail addresses further includes:

identifying the address domain name of a disfavored e-mail address to be associated;

determining whether the identified address domain name has a linked forwarding rule;

determining whether associating the disfavored e-mail address with a corresponding forwarding address is in accordance with the linked forwarding rule;

aborting the association of the disfavored e-mail address with the corresponding forwarding address if it is not in accordance with the associated forwarding rule.

10. The method of claim 9 including the step of setting a forwarding rule for a domain name, the rule disallowing associating forwarding e-mail addresses with disfavored e-mail addresses with the domain name unless a request to make the association is received from a particular address.

11. The method of claim 9 including the step of setting a forwarding rule for a domain name, the rule disallowing associating forwarding e-mail addresses with disfavored e-mail addresses with the domain name unless a request to make the association includes a valid security code.

12. The method of claim 1 further comprising the step of:

linking an address domain name to at least one forwarding rule; and the step of forwarding further includes:

identifying the address domain name of a disfavored e-mail address to be forwarded;

determining whether the identified address domain name has a linked forwarding rule; and formatting the portion of the message to be forwarded in accordance with the linked forwarding rule.

13. The method of claim 1 further comprising the steps of:

linking an address domain name to at least one forwarding rule;

identifying the address domain name of a disfavored e-mail address to be forwarded;

determining whether the identified address domain name has a linked forwarding rule; and sending a return message to a message originator in accordance with the linked forwarding rule.

14. The method of claim 1 further comprising the steps of:
linking an address domain name to at least one forwarding rule;
identifying the address domain name of a disfavored e-mail address to be forwarded;
determining whether the identified address domain name has a linked forwarding rule; and
wherein the step of forwarding includes forwarding the portion of the message in accordance with the linked forwarding rule.

15. The method of claim 14 wherein the step of forwarding the message in accordance with the linked forwarding rule further includes:
sending a forward confirmation request, indicating that the message will be forwarded, to a message originator; and
waiting until a forwarding confirmation authorization is received from the message originator before initiating the forwarding step.

16. The method of claim 15 further including the steps of:
including an activatable link along with the forwarding confirmation request, wherein the activatable link will automatically send the forwarding confirmation authorization to the e-mail forwarding computer when activated by the message originator.

17. The method of claim 1 further including the following steps prior to the forwarding step:
identifying that the disfavored e-mail address is that of the departed organization member,
sending a forward confirmation request, indicating that the message originally intended for the departed organization member will be forwarded to the successor organization member, to a message originator; and
waiting until a forwarding confirmation authorization is received from the message originator before initiating the forwarding step.

18. The method of claim 1 wherein the step of associating a plurality of disfavored e-mail addresses further comprises:
registering an organization e-mail system with the e-mail forwarding computer;
uploading domain name information for the organization e-mail system to the e-mail forwarding computer;
uploading e-mail address format information for the organization e-mail system to the e-mail forwarding computer; and
uploading organization member e-mail address change information for the organization e-mail system to the e-mail forwarding computer.

19. The method of claim 18 further including
uploading recipient change flags associated with the address change information indicating that the address change information pertains to a substitution of a new recipient not previously associated with the disfavored e-mail address;
if the determined forwarding e-mail address is associated with a recipient change flag, sending a forward confirmation request, indicating that the message will be forwarded to a different recipient, to a message originator; and
waiting until a forwarding confirmation authorization is received from the message originator before initiating the forwarding step.

20. The method of claim 1 further including the steps of:
receiving an e-mail message at an e-mail system server for an e-mail service provider;
determining at the e-mail system server that the e-mail message is undeliverable;
automatically redirecting the undeliverable e-mail message to the electronic address of the e-mail forwarding computer, the undeliverable e-mail message becoming the received message at the e-mail forwarding computer.

21. The method of claim 20 further including the step of:
determining at the e-mail system server whether the e-mail message includes a flag indicating whether or not to automatically redirect the e-mail message if it is undeliverable; and
returning the undeliverable e-mail message if the flag indicates that the undeliverable e-mail message should not be automatically redirected.

22. The method as recited in claim 20, wherein prior to the step of automatically redirecting the undeliverable e-mail message, including the step of:
sending a redirect confirmation request, indicating that the message will be redirected to the e-mail forwarding computer, to a message originator; and
waiting until a redirecting confirmation authorization is received from the message originator before initiating the automatic redirecting step.

23. The method as recited in claim 20 wherein prior to the forwarding step:
sending a forward confirmation request, indicating that the message will be forwarded, to a message originator; and
waiting until a forwarding confirmation authorization is received from the message originator before initiating the forwarding step.

24. The method of claim 23 further including the steps of:
including an activatable link along with the forwarding confirmation request, wherein the activatable link will automatically send the forwarding confirmation authorization to the e-mail forwarding computer when activated by the message originator.

25. The method as recited in claim 20 wherein the step of associating a plurality of disfavored e-mail addresses further comprises:
receiving a forwarding address request indicating a disfavored e-mail address;
sending an address change confirmation request to the disfavored e-mail address;
receiving an address change confirmation response;
authenticating the address change confirmation response; and
storing the forwarding e-mail address and associated disfavored e-mail address for the forwarding address request for which an authenticated address change confirmation response is received.

26. The method of claim 25 wherein the step of authenticating includes identifying that the address change confirmation response came from the disfavored e-mail address.

27. The method of claim 25 wherein:
the steps of sending an address change confirmation request and authenticating the address change confirmation response use encryption verification.

28. The method of claim 25 further comprising the steps of:
identifying unverified forwarding e-mail addresses for which no authenticated address change confirmation response was received;

when the received message includes a disfavored e-mail address with an unverified forwarding e-mail address, sending a forward confirmation request, indicating that an unverified forwarding e-mail address has been determined, to a message originator; and waiting until a forwarding confirmation authorization is received from the message originator before initiating the forwarding step.

29. The method of claim 20 further comprising the steps of:

linking an address domain name to at least one forwarding rule; and the step of associating a plurality of disfavored e-mail addresses further includes:

identifying the address domain name of a disfavored e-mail address to be associated;

determining whether the identified address domain name has a linked forwarding rule;

determining whether associating the disfavored e-mail address with a corresponding forwarding address is in accordance with the linked forwarding rule; aborting the association of the disfavored e-mail address with the corresponding forwarding address if it is not in accordance with the associated forwarding rule.

30. The method of claim 29 including the step of setting a forwarding rule for a domain name, the rule disallowing associating forwarding e-mail addresses with disfavored e-mail addresses with the domain name unless a request to make the association is received from a particular address.

31. The method of claim 29 including the step of setting a forwarding rule for a domain name, the rule disallowing associating forwarding e-mail addresses with disfavored e-mail addresses with the domain name unless a request to make the association includes a valid security code.

32. The method of claim 20 further comprising the step of:

linking an address domain name to at least one forwarding rule; and the step of forwarding further includes:

identifying the address domain name of a disfavored e-mail address to be forwarded;

determining whether the identified address domain name has a linked forwarding rule; and formatting the portion of the message to be forwarded in accordance with the linked forwarding rule.

33. The method of claim 20 further comprising the steps of:

linking an address domain name to at least one forwarding rule;

identifying the address domain name of a disfavored e-mail address to be forwarded;

determining whether the identified address domain name has a linked forwarding rule; and sending a return message to a message originator in accordance with the linked forwarding rule.

34. The method of claim 20 further comprising the steps of:

linking an address domain name to at least one forwarding rule;

identifying the address domain name of a disfavored e-mail address to be forwarded;

determining whether the identified address domain name has a linked forwarding rule; and wherein the step of forwarding includes forwarding the portion of the message in accordance with the linked forwarding rule.

35. The method of claim 34 wherein the step of forwarding the message in accordance with the linked forwarding rule further includes:

sending a forward confirmation request, indicating that the message will be forwarded, to a message originator; and waiting until a forwarding confirmation authorization is received from the message originator before initiating the forwarding step.

36. The method of claim 20 wherein an organization having an e-mail system desires to have messages that are sent to do a departed member's e-mail address forwarded to a successor member's e-mail address, and wherein the step of associating a plurality of disfavored e-mail addresses includes:

associating the departed member's disfavored e-mail address with the successor member's e-mail address as a corresponding forwarding, address.

37. The method of claim 36 further including the following steps prior to the forwarding step:

identifying that the disfavored e-mail address is that of the departed organization member, sending a forward confirmation request, indicating that the message originally intended for the departed organization member will be forwarded to the successor organization member, to a message originator; and waiting until a forwarding confirmation authorization is received from the message originator before initiating the forwarding step.

38. The method of claim 20 wherein the step of associating a plurality of disfavored e-mail addresses further comprises:

registering an organization e-mail system with the e-mail forwarding computer;

uploading domain name information for the organization e-mail system to the e-mail forwarding computer;

uploading e-mail address format information for the organization e-mail system to the e-mail forwarding computer; and uploading organization member e-mail address change information for the organization e-mail system to the e-mail forwarding computer.

39. The method of claim 20 further including:

storing unwanted sender address information associated with corresponding forwarding e-mail addresses;

identifying a sender address in the received message;

prior to the step of forwarding at least a portion of the received message, determining whether the sender address is an unwanted sender address associated with the forwarding e-mail address; and if the sender address is an unwanted sender address associated with the forwarding e-mail address, then canceling the step of forwarding at least a portion of the received message.

40. The method of claim 20 further including:

storing information at the e-mail forwarding computer relating to an unforwardable received message if no forwarding e-mail address is determined by the e-mail forwarding computer;

after the step of storing information, registering e-mail addresses with the e-mail forwarding computer;

determining a registered e-mail address corresponding to the unforwardable received message using the stored information;

forwarding at least a portion of the previously unforwardable received message to the registered e-mail address or an e-mail address associated with the registered e-mail address in the e-mail forwarding computer.

41. The method of claim 40 wherein prior to forwarding at least a portion of the previously unforwardable received message the following steps occur:
sending a forward confirmation request, indicating that the message will be forwarded, to a message originator; and
waiting until a forwarding confirmation authorization is received from the message originator before forwarding at least a portion of the previously unforwardable received message.

42. The method of claim 1 further including the steps of:
sending an e-mail message from an originator to an e-mail address at an e-mail system server for an e-mail service provider;
determining at the e-mail system server that the e-mail address is undeliverable;
returning the undeliverable message to the originator;
including a prompt, along with the returned undeliverable message from the e-mail system server to the originator, to send the undeliverable message to the electronic address for the e-mail forwarding computer; and
sending the undeliverable e-mail message from the originator to the e-mail forwarding computer whereby the undeliverable message becomes the received message at the e-mail forwarding computer.

43. The method of claim 42 wherein the prompt comprises an activatable link to automatically send the undeliverable message to the electronic address for the e-mail forwarding computer; and the step of sending the undeliverable e-mail message includes activating the activatable link.

44. The method of claim 1 further including the steps of:
sending an e-mail message from an originator to an e-mail address at an e-mail system server for an e-mail service provider;
determining at the e-mail system server that the e-mail address is undeliverable;
returning the undeliverable message to the originator;
sending the undeliverable e-mail message from the originator to the e-mail forwarding computer whereby the undeliverable message becomes the received message at the e-mail forwarding computer.

45. The method as recited in claim 44 wherein the step of associating a plurality of disfavored e-mail addresses further comprises:
receiving a forwarding address request indicating a disfavored e-mail address;
sending an address change confirmation request to the disfavored e-mail address;
receiving an address change confirmation response;
authenticating the address change confirmation response; and
storing the forwarding e-mail address and associated disfavored e-mail address for the forwarding address request for which an authenticated address change confirmation response is received.

46. The method of claim 45 wherein the step of authenticating includes identifying that the address change confirmation response came from the disfavored e-mail address.

47. The method of claim 45 wherein:
the steps of sending an address change confirmation request and authenticating the address change confirmation response use encryption verification.

48. The method of claim 45 further comprising the steps of:
identifying unverified forwarding e-mail addresses for which no authenticated address change confirmation response was received;
when the received message includes a disfavored e-mail address with an unverified forwarding e-mail address, sending a forward confirmation request, indicating that an unverified forwarding e-mail address has been determined, to a message originator; and
waiting until a forwarding confirmation authorization is received from the message originator before initiating the forwarding step.

49. The method of claim 44 further comprising the steps of:
linking an address domain name to at least one forwarding rule; and
the step of associating a plurality of disfavored e-mail addresses further includes:
identifying the address domain name of a disfavored e-mail address to be associated;
determining whether the identified address domain name has a linked forwarding rule;
determining whether associating the disfavored e-mail address with a corresponding forwarding address is in accordance with the linked forwarding rule;
aborting the association of the disfavored e-mail address with the corresponding forwarding address if it is not in accordance with the associated forwarding rule.

50. The method of claim 49 including the step of setting a forwarding rule for a domain name, the rule disallowing associating forwarding e-mail addresses with disfavored e-mail addresses with the domain name unless a request to make the association is received from a particular address.

51. The method of claim 49 including the step of setting a forwarding rule for a domain name, the rule disallowing associating forwarding e-mail addresses with disfavored e-mail addresses with the domain name unless a request to make the association includes a valid security code.

52. The method of claim 44 further comprising the step of:
linking an address domain name to at least one forwarding rule; and
the step of forwarding further includes:
identifying the address domain name of a disfavored e-mail address to be forwarded;
determining whether the identified address domain name has a linked forwarding rule; and
formatting the portion of the message to be forwarded in accordance with the linked forwarding rule.

53. The method of claim 44 further comprising the steps of:
linking an address domain name to at least one forwarding rule;
identifying the address domain name of a disfavored e-mail address to be forwarded;
determining whether the identified address domain name has a linked forwarding rule; and
sending a return message to a message originator in accordance with the linked forwarding rule.

54. The method of claim 44 further comprising the steps of:

linking an address domain name to at least one forwarding rule;

identifying the address domain name of a disfavored e-mail address to be forwarded;

determining whether the identified address domain name has a linked forwarding rule; and wherein the step of forwarding includes forwarding the portion of the message in accordance with the linked forwarding rule.

55. The method of claim 54 wherein the step of forwarding the message in accordance with the linked forwarding rule further includes:

sending a forward confirmation request, indicating that the message will be forwarded, to a message originator; and waiting until a forwarding confirmation authorization is received from the message originator before initiating the forwarding step.

56. The method of claim 44, wherein an organization having an e-mail system desires to have messages that are sent to do a departed member's e-mail address forwarded to a successor member's e-mail address, and wherein the step of associating a plurality of disfavored e-mail addresses includes:

associating the departed member's disfavored e-mail address with the successor member's e-mail address as a corresponding forwarding address.

57. The method of claim 56 further including the following steps prior to the forwarding step:

identifying that the disfavored e-mail address is that of the departed organization member, sending a forward confirmation request, indicating that the message originally intended for the departed organization member will be forwarded to the successor organization member, to a message originator; and waiting until a forwarding confirmation authorization is received from the message originator before initiating the forwarding step.

58. The method of claim 57 further including the steps of:

including an activatable link along with the forwarding confirmation request, wherein the activatable link will automatically send the forwarding confirmation authorization to the e-mail forwarding computer when activated by the message originator.

59. The method of claim 44 wherein the step of associating a plurality of disfavored e-mail addresses further comprises:

registering an organization e-mail system with the e-mail forwarding computer;

uploading domain name information for the organization e-mail system to the e-mail forwarding computer;

uploading e-mail address format information for the organization e-mail system to the e-mail forwarding computer; and uploading organization member e-mail address change information for the organization e-mail system to the e-mail forwarding computer.

60. A method to forward messages to forwarding e-mail addresses, the method comprising:

receiving an e-mail message from an originator to an e-mail address at an e-mail system server for an e-mail service provider;

determining at the e-mail system server that the e-mail address is undeliverable;

returning the undeliverable message to the originator;

including a prompt, along with the returned undeliverable message from the e-mail system server to the originator, to send the undeliverable message to the electronic address for an e-mail forwarding computer wherein the prompt comprises an activatable link to automatically send the undeliverable message to the electronic address for the e-mail forwarding computer.

61. A method to forward messages to forwarding e-mail addresses, the method comprising the steps of:

associating a plurality of disfavored e-mail addresses with corresponding forwarding e-mail addresses in an e-mail forwarding computer including:

receiving a forwarding address request indicating a disfavored e-mail address;

sending an address change confirmation request to the disfavored e-mail address;

receiving an address change confirmation response;

authenticating the address change confirmation response; and storing the forwarding e-mail address and associated disfavored e-mail address for the forwarding address request for which an authenticated address change confirmation response is received;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

forwarding at least a portion of the received message from the e-mail forwarding computer to the associated forwarding e-mail address;

identifying unverified forwarding e-mail addresses for which no authenticated address change confirmation response was received;

when the received message includes a disfavored e-mail address with an unverified forwarding e-mail address, sending a forward confirmation request, indicating that an unverified forwarding e-mail address has been determined, to a message originator; and waiting until a forwarding confirmation authorization is received from the message originator before initiating the forwarding step.

62. A method to forward messages to forwarding e-mail addresses, the method comprising the steps of:

associating a plurality of disfavored e-mail addresses with corresponding forwarding e-mail addresses in an e-mail forwarding computer including:

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

forwarding at least a portion of the received message from the e-mail forwarding computer to the associated forwarding e-mail address;

linking an address domain name to at least one forwarding rule wherein the step of associating a plurality of disfavored e-mail addresses further includes:

identifying the address domain name of a disfavored e-mail address to be associated;

determining whether the identified address domain name has a linked forwarding rule;

determining whether associating the disfavored e-mail address with a corresponding forwarding address is in accordance with the linked forwarding rule; and aborting the association of the disfavored e-mail address with the corresponding forwarding address if it is not in accordance with the associated forwarding rule.

63. A method to forward messages to forwarding e-mail addresses, the method comprising the steps of:

associating a plurality of disfavored e-mail addresses with corresponding forwarding e-mail addresses in an e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

forwarding at least a portion of the received message from the e-mail forwarding computer to the associated forwarding e-mail address; and linking an address domain name to at least one forwarding rule wherein the step of forwarding further includes:
identifying the address domain name of a disfavored e-mail address to be forwarded;
determining whether the identified address domain name has a linked forwarding rule; and
formatting the portion of the message to be forwarded in accordance with the linked forwarding rule.

64. A method to forward messages to forwarding e-mail addresses, the method comprising the steps of:

associating a plurality of disfavored e-mail addresses with corresponding forwarding e-mail addresses in an e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

forwarding at least a portion of the received message from the e-mail forwarding computer to the associated forwarding e-mail address;

linking an address domain name to at least one forwarding rule;

identifying the address domain name of a disfavored e-mail address to be forwarded;

determining whether the identified address domain name has a linked forwarding rule; and sending a return message to a message originator in accordance with the linked forwarding rule.

65. A method to forward messages to forwarding e-mail addresses, the method comprising the steps of:

associating a plurality of disfavored e-mail addresses with corresponding forwarding e-mail addresses in an e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

forwarding at least a portion of the received message from the e-mail forwarding computer to the associated forwarding e-mail address;

linking an address domain name to at least one forwarding rule;

identifying the address domain name of a disfavored e-mail address to be forwarded;

determining whether the identified address domain name has a linked forwarding rule; and wherein the step of forwarding includes forwarding the portion of the message in accordance with the linked forwarding rule.

66. A method to forward messages to forwarding e-mail addresses, the method comprising the steps of:

associating a plurality of disfavored e-mail addresses with corresponding forwarding e-mail addresses in an e-mail forwarding computer, including:
registering an organization e-mail system with the e-mail forwarding computer;
uploading domain name information for the organization e-mail system to the e-mail forwarding computer;
uploading e-mail address format information for the organization e-mail system to the e-mail forwarding computer; and
uploading organization member e-mail address change information for the organization e-mail system to the e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address; and forwarding at least a portion of the received message from the e-mail forwarding computer to the associated forwarding e-mail address.

67. A method to forward messages to forwarding e-mail addresses, the method comprising the steps of:

associating a plurality of disfavored e-mail addresses with corresponding forwarding e-mail addresses in an e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

sending a forward confirmation request, indicating that the message will be forwarded, to a message originator;

waiting until a forwarding confirmation authorization is received from the message originator before initiating the forwarding step;

forwarding at least a portion of the received message from the e-mail forwarding computer to the associated forwarding e-mail address;

receiving an e-mail message at an e-mail system server for an e-mail service provider;

determining at the e-mail system server that the e-mail message is undeliverable;

automatically redirecting the undeliverable e-mail message to the electronic address of the e-mail forwarding computer, the undeliverable e-mail message becoming the received message at the e-mail forwarding computer.

68. A method to forward messages to forwarding e-mail addresses, the method comprising the steps of:

associating a plurality of disfavored e-mail addresses with corresponding forwarding e-mail addresses in an e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

sending a forward confirmation request, indicating that the message will be forwarded, to a message originator;

waiting until a forwarding confirmation authorization is received from the message originator before initiating the forwarding step;

forwarding at least a portion of the received message from the e-mail forwarding computer to the associated forwarding e-mail address;

sending an e-mail message from an originator to an e-mail address at an e-mail system server for an e-mail service provider;

determining at the e-mail system server that the e-mail address is undeliverable;

returning the undeliverable message to the originator; and sending the undeliverable e-mail message from the originator to the e-mail forwarding computer whereby the undeliverable message becomes the received message at the e-mail forwarding computer.

* * * * *